United States Patent
Komiyama et al.

[11] Patent Number: 5,858,051
[45] Date of Patent: Jan. 12, 1999

[54] METHOD OF MANUFACTURING OPTICAL WAVEGUIDE

[75] Inventors: Yoshizo Komiyama, Susono; Isao Matsuzuki, Numazu; Kazunori Urushibata, Shizuoka-ken; Toshihisa Kamano, Mishima; Tetsuya Tanioka, Mishima; Hirotaka Masaki, Mishima, all of Japan

[73] Assignee: Toshiba Machine Co., Ltd., Tokyo, Japan

[21] Appl. No.: 646,966

[22] Filed: May 8, 1996

[30] Foreign Application Priority Data

May 8, 1995 [JP] Japan ................................ 7-109579
May 8, 1995 [JP] Japan ................................ 7-109580
Jun. 23, 1995 [JP] Japan ................................ 7-157983
Jun. 23, 1995 [JP] Japan ................................ 7-157984

[51] Int. Cl.$^6$ .................................................. C03B 37/022
[52] U.S. Cl. .................................. 65/386; 65/42; 65/44; 65/55; 65/102; 65/106
[58] Field of Search .................. 65/386, 40, 42, 65/43, 44, 55, 60.2, 61, 102, 106, 152, 156

[56] References Cited

U.S. PATENT DOCUMENTS

| | | | |
|---|---|---|---|
| 865,136 | 9/1907 | Wadsworth | 65/44 |
| 3,361,548 | 1/1968 | Hamilton et al. | 65/42 |
| 3,719,462 | 3/1973 | Andreatch, Jr. et al. | 65/102 X |
| 3,860,405 | 1/1975 | Coucoulas et al. | 65/42 |
| 4,375,312 | 3/1983 | Tangonan | 65/386 X |
| 5,125,946 | 6/1992 | Bhagavatula | 65/106 |

FOREIGN PATENT DOCUMENTS 58-28707 2/1983 Japan.
60-43614 3/1985 Japan.

*Primary Examiner*—Donald E. Czaja
*Assistant Examiner*—Sean Vincent
*Attorney, Agent, or Firm*—Cushman Darby & Cushman; IP Group of Pillsbury; Madison & Sutro LLP

[57] ABSTRACT

A method of manufacturing an optical waveguide comprises a first step of laminating, on one major surface of a first glass material, a second glass material to a desired thickness, the second glass material having optical characteristics different from those of the first glass material, a second step of forming the second glass material to have a desired circuit pattern, and a third step of laminating a third glass material having optical characteristics similar to those of the first glass material on an entire surface of the first glass material on which the circuit pattern is formed by the second glass material. In at least one of the first and third steps, the glass material to be laminated is laminated by coupling.

25 Claims, 13 Drawing Sheets

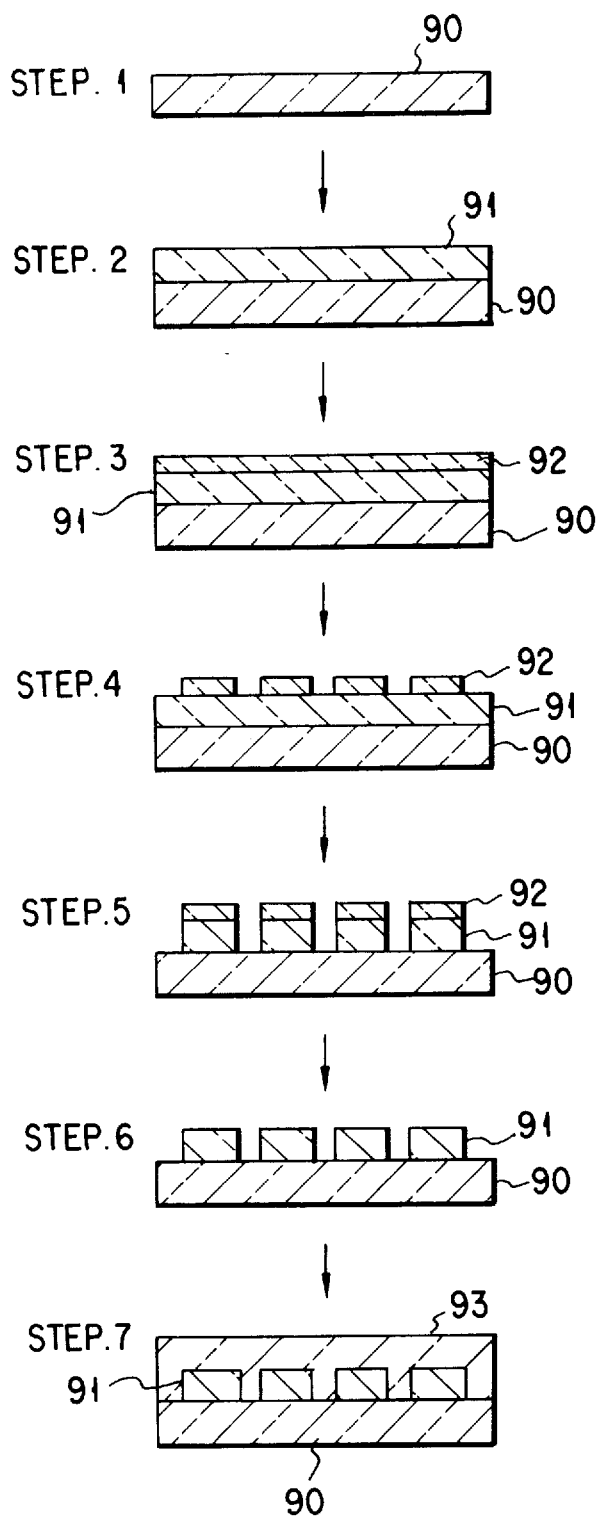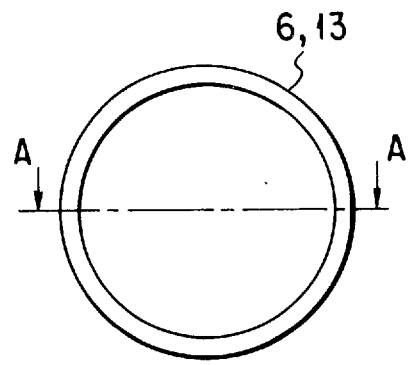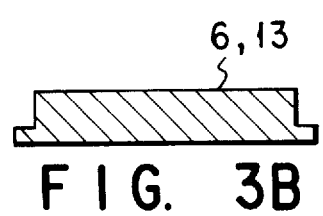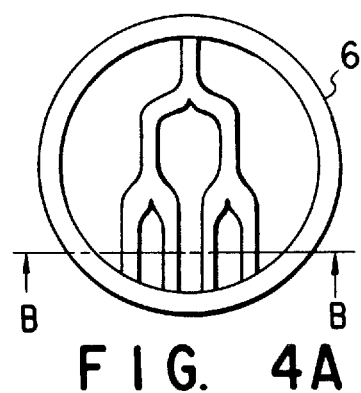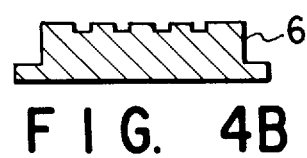
FIG. 1 (PRIOR ART)
FIG. 3A
FIG. 3B
FIG. 4A
FIG. 4B

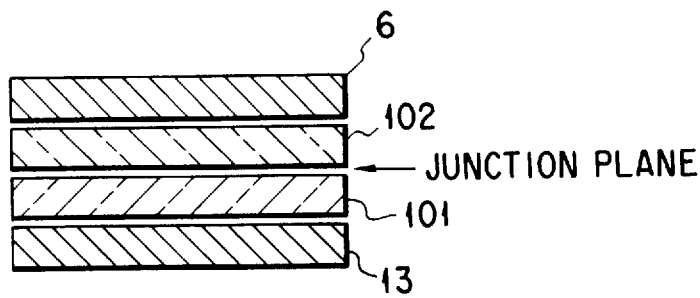
FIG. 9A
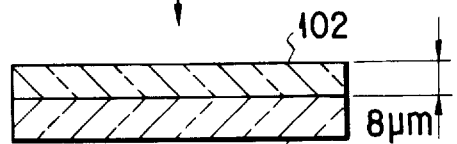
FIG. 9B
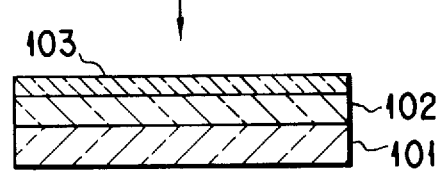
FIG. 9C
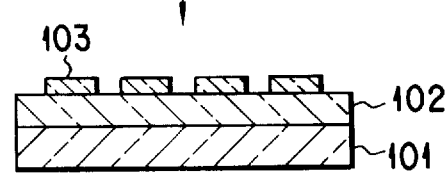
FIG. 9D
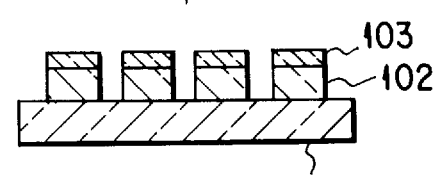
FIG. 9E
FIG. 9G
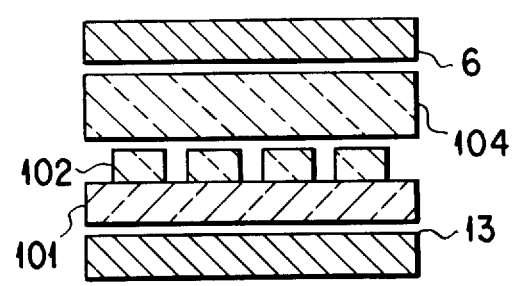
FIG. 9H
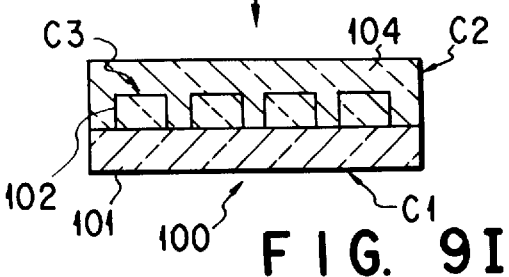
FIG. 9F
FIG. 9I

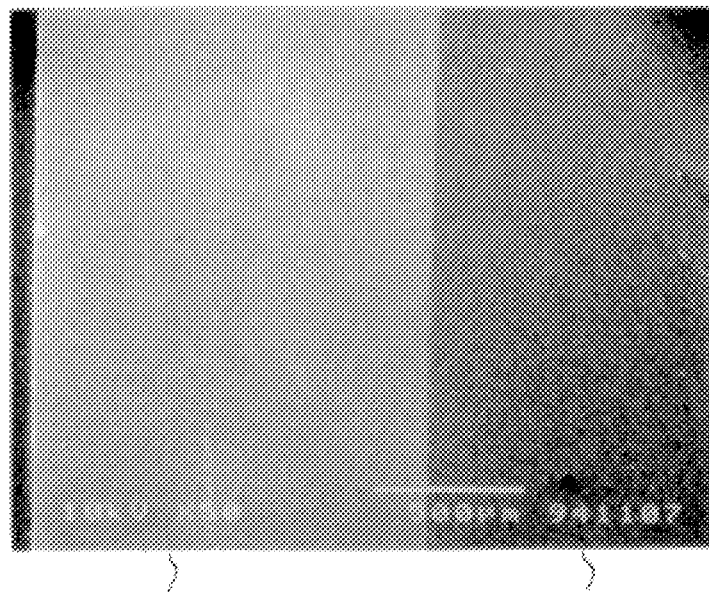
F I G. 10
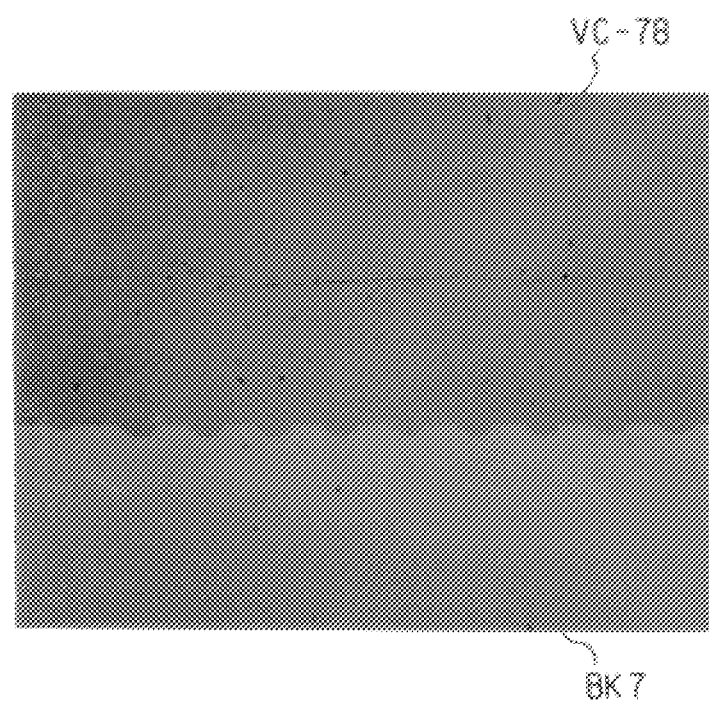
F I G. 12

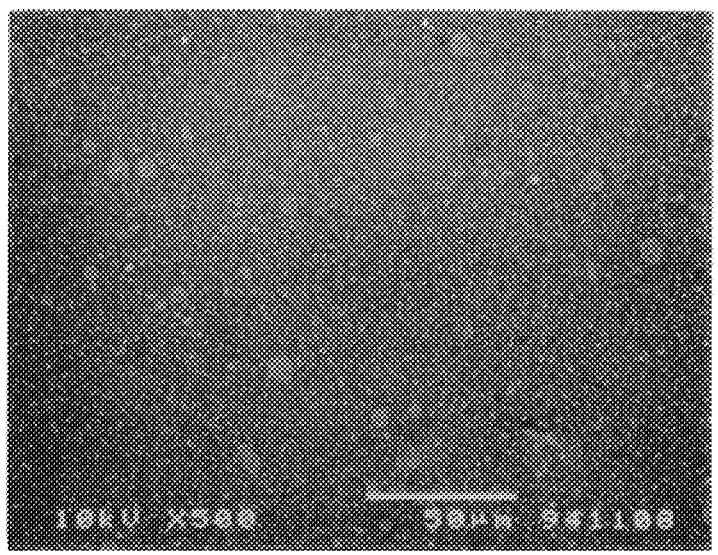
F I G. 13
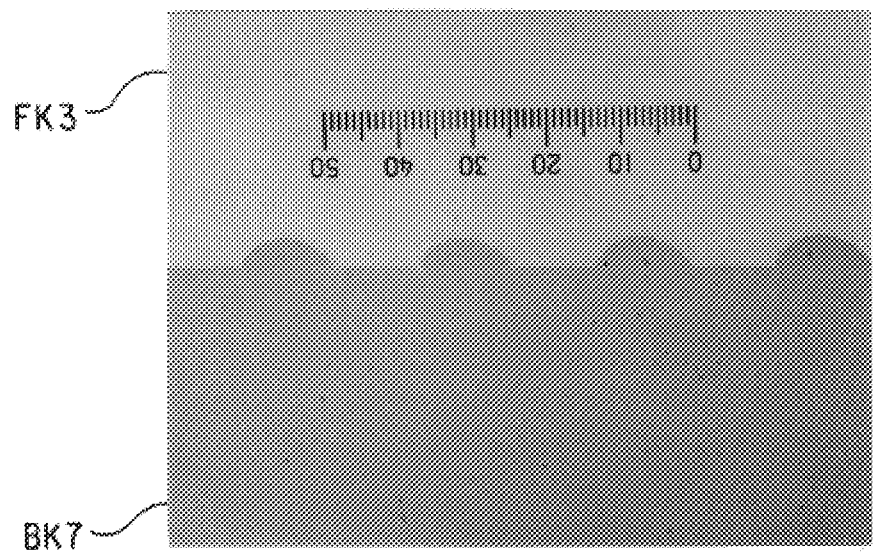
F I G. 17

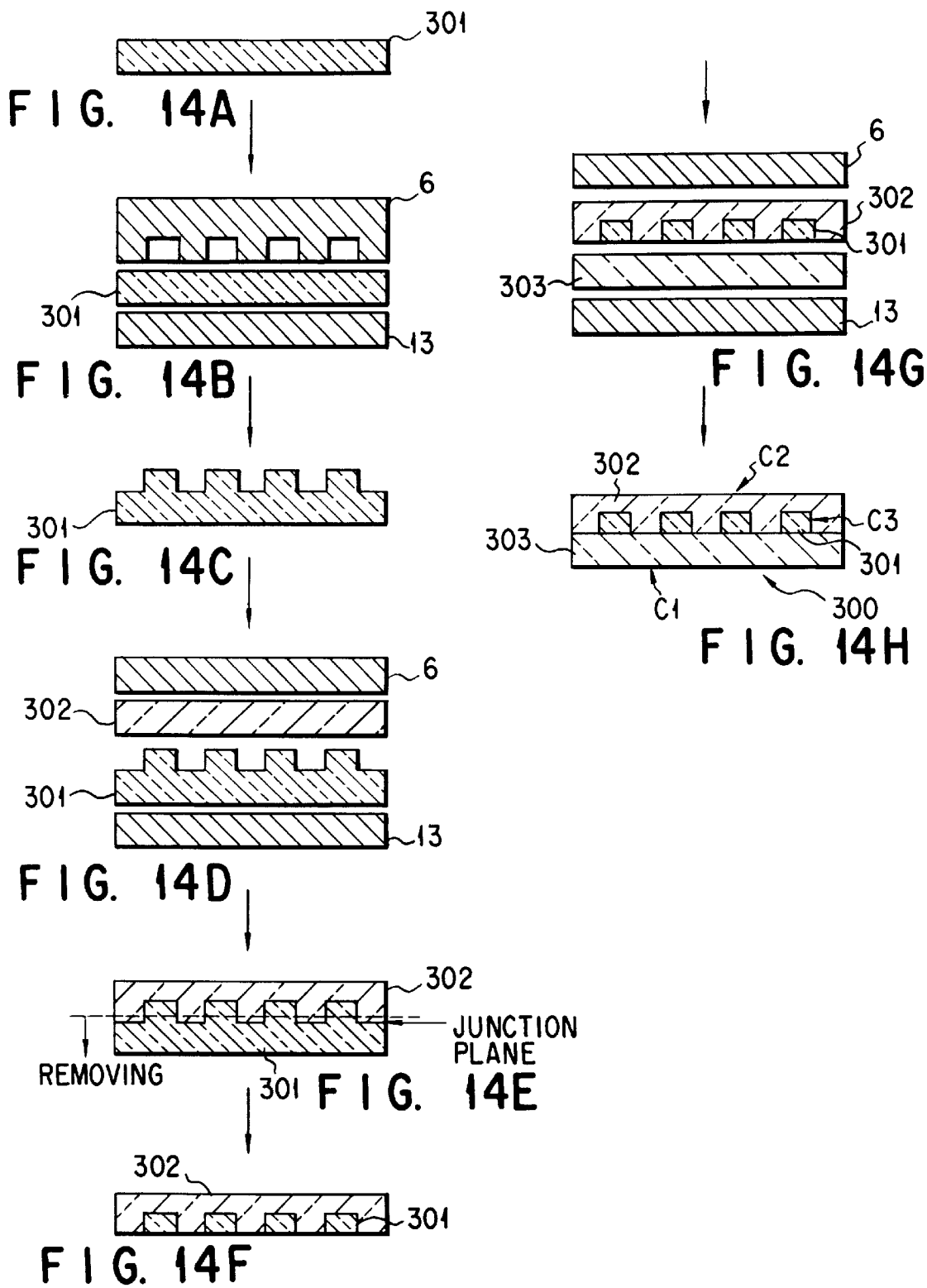

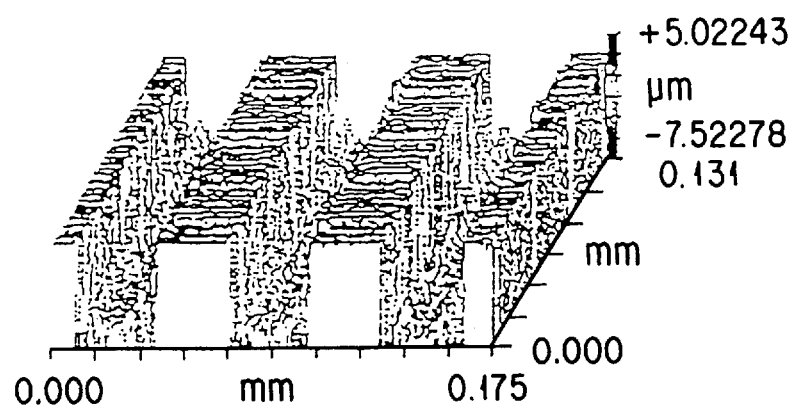
F I G. 15
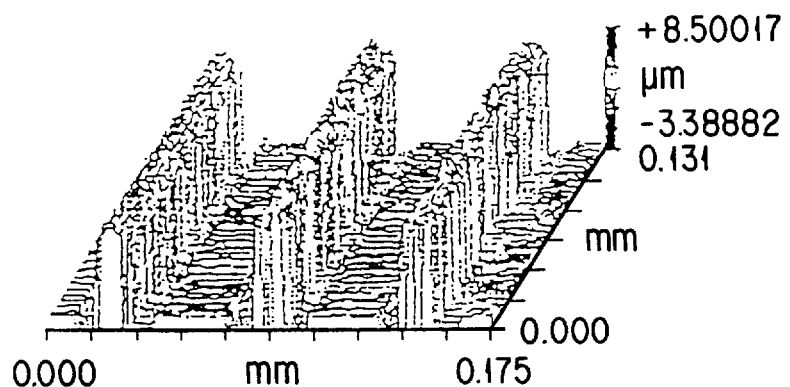
F I G. 16

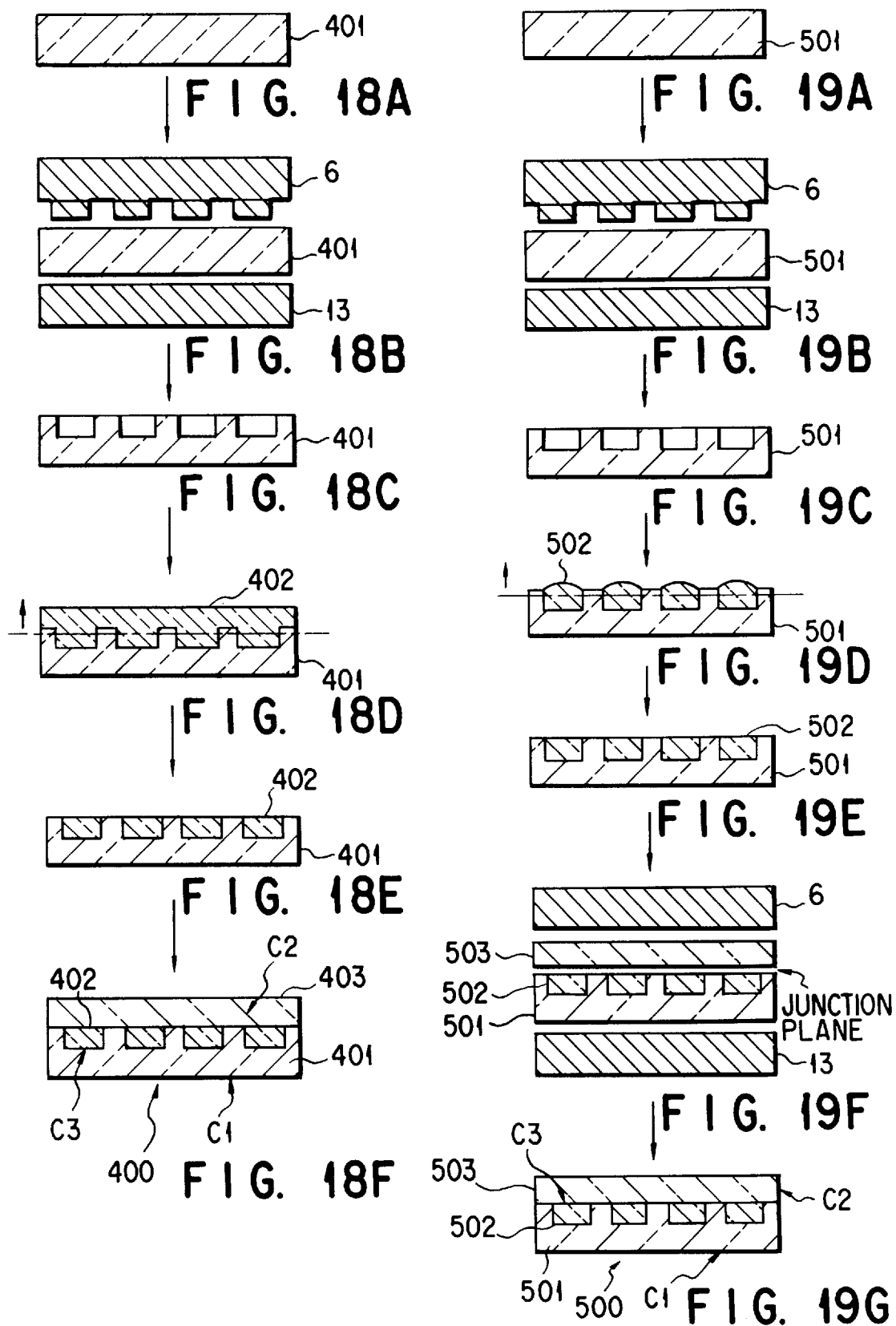

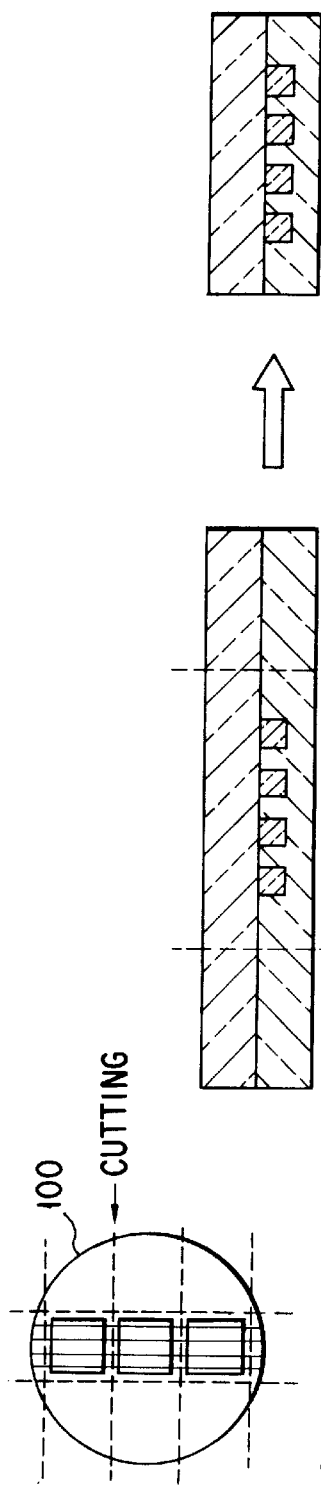
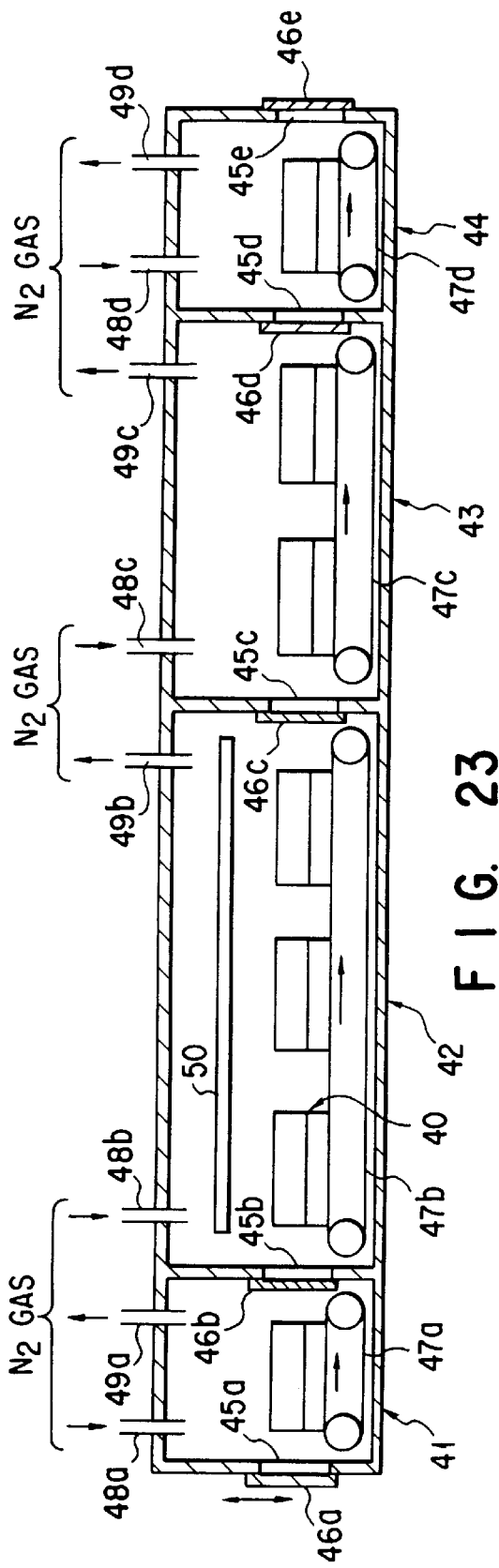

METHOD OF MANUFACTURING OPTICAL WAVEGUIDE

BACKGROUND OF THE INVENTION

1. Field of the Invention

The present invention relates generally to a method of manufacturing an optical waveguide and more particularly to a method of manufacturing an optical waveguide, in which the number of manufacturing steps is reduced with respect to known manufacturing techniques.

2. Description of the Related Art

In the modern information-orientated society, a great deal of information needs to be exchanged at high speed and optical communication is indispensable for such high-speed exchange of information. The phrase "fiber to the home (FTTH)," is becoming increasingly used to refer to optical communication networks having runs to individual homes.

However, optical waveguides must be formed to very precise tolerances and should meet the following requirements: stability of shape of a core portion, roughness of interface between a core and a cladding, and smallness in amount of near infrared (1.3 to 1.5 $\mu$m) light absorbed in glass material of the core and cladding.

A conventional process of manufacturing an optical waveguide comprises many steps such as film forming steps with use of a vacuum apparatus. Examples of conventional steps for manufacturing an optical waveguide will now be described with reference to FIG. 1.

At first, a silicon dioxide ($SiO_2$) substrate 90 which will become a cladding layer of the optical waveguide is prepared (STEP 1).

The upper surface of the $SiO_2$ substrate 90 prepared in step 1 is coated by CVD (chemical vapor deposition) with a film of a substance having a higher refractive index than $SiO_2$, e.g. Ge-$SiO_2$ film, to a thickness of about several $\mu$m (STEP 2). The Ge-$SiO_2$ film 91 will become a core of the optical waveguide.

A photoresist 92 with a thickness of about several $\mu$m is coated on the Ge-$SiO_2$ film 91 deposited in STEP 2 (STEP 3).

The photoresist 92 coated in STEP 3 is exposed with ultraviolet radiation and developed so that the optical waveguide has a desired circuit configuration (STEP 4). Thus, only that portion of the photoresist 92, which corresponds to the desired circuit configuration, is left.

With the photoresist 92 exposed and developed in STEP 4 being used, the Ge-$SiO_2$ film 91 is etched away (STEP 5). Thus, only that portion of the Ge-$SiO_2$ film 91, which corresponds to the circuit configuration, is left.

The photoresist 92 left in STEP 4 is removed (STEP 6).

An $SiO_2$ film 93 with a thickness of about several $\mu$m, which will become a cladding layer of the optical waveguide, is coated by CVD on the $SiO_2$ substrate 90 and Ge-$SiO_2$ film 91 (STEP 7).

Thus, the optical waveguide, which comprises the $SiO_2$ substrate 90 serving as cladding, the Ge-$SiO_2$ film 91 serving as core and the $SiO_2$ film 93 serving as cladding, is formed.

In STEPS 2 and 7, the coating layers are formed by a so-called deposition process such as chemical vapor deposition (CVD), flame hydrolysis deposition (FHD) or physical vapor deposition (PVD), or by a sol-gel method. The etching in STEP 5 is performed by reactive ion etching (RIE), etc. These manufacturing steps are performed by using a vacuum apparatus, and a great deal of time and cost is required.

The above-described conventional method of manufacturing the optical waveguide requires many manufacturing steps and a great deal of time, resulting in a high manufacturing cost. This poses a serious problem in development of optical communication networks.

SUMMARY OF THE INVENTION

The object of the present invention is to provide a method of manufacturing an optical waveguide, wherein the manufacturing steps are simplified, the time for manufacture is shortened, and the manufacturing cost is reduced.

According to the present invention, there is provided a method of manufacturing an optical waveguide comprising:

a first step of laminating, on one major surface of a first glass material, a second glass material to a desired thickness, the second glass material having optical characteristics different from those of the first glass material;

a second step of forming the second glass material to have a desired circuit pattern; and a third step of laminating a third glass material having optical characteristics similar to those of the first glass material on an entire surface of the first glass material on which the circuit pattern is formed by the second glass material, wherein in at least one of the first and third steps, the glass material to be laminated is laminated by coupling.

According to this method, in at least one of the first and third steps, a plate-like glass material is laminated by coupling. Thus, as compared to a conventional method in which a glass material is deposited, the manufacturing steps are simplified. Therefore, the time for manufacture is shortened, and the manufacturing cost is reduced.

According to this invention, there is also provided a method of manufacturing an optical waveguide, comprising:

a first step of forming a recessed portion in a first glass material in accordance with a desired circuit pattern;

a second step of laminating a second glass material having optical characteristics different from those of the first glass material by burying the second glass material in the recessed portion of the first glass material;

a third step of removing that portion of the second glass material, which is located outside the recessed portion; and a fourth step of laminating a third glass material having optical characteristics similar to those of the first glass material on that surface of the first glass material, in which the second glass material is buried, wherein in at least one of the second and fourth steps, the glass material to be laminated is laminated by coupling.

According to this method, in at least one of the second and fourth steps, a plate-like glass material is laminated by coupling. Thus, as compared to a conventional method in which a glass material is deposited, the manufacturing steps are simplified. Therefore, the time for manufacture is shortened, and the manufacturing cost is reduced.

There is also provided a method of manufacturing an optical waveguide, comprising:

a first step of forming a projecting portion on a first glass material in accordance with a desired circuit pattern;

a second step of laminating a second glass material having optical characteristics different from those of the first glass material on an entire surface of the first glass material on which the projecting portion is formed;

a third step of removing that portion of the first glass material, from which the projecting portion is excluded; and a fourth step of laminating a third glass material having optical characteristics similar to those of the second glass material on that surface of the first glass material, from which the portion of the first glass material is removed, wherein in at least one of the second and fourth steps, the glass material to be laminated is laminated by coupling.

According to this method, in the first step, a plate-like glass material is formed to have a desired circuit pattern. As compared to a conventional method in which a glass material is patterned by etching, the manufacturing steps are simplified and the time for manufacture is shortened. In addition, in at least one of the second and fourth steps, a plate-like glass material is laminated by coupling. Thus, as compared to a conventional method in which a glass material is deposited, the manufacturing steps are simplified. Therefore, the time for manufacture is shortened, and the manufacturing cost is reduced.

There is also provided a method of manufacturing an optical waveguide, comprising:

a first step of forming a recessed portion in a first glass material in accordance with a desired circuit pattern;

a second step of laminating a second glass material having optical characteristics different from those of the first glass material by burying the second glass material in the recessed portion of the first glass material;

a third step of removing that portion of the second glass material, which is located outside the recessed portion; and a fourth step of laminating a third glass material having optical characteristics similar to those of the first glass material on that surface of the first glass material, in which the second glass material is buried, wherein in the first step, the recessed portion corresponding to the desired circuit pattern is formed by molding the first glass material with use of a mold having a projecting portion formed in accordance with the desired circuit pattern, and in at least one of the second and fourth steps, the glass material to be laminated is laminated by coupling.

According to this method, in the first step, a plate-like glass material is formed to have a desired circuit pattern. As compared to a conventional method in which a glass material is patterned by etching, the manufacturing steps are simplified and the time for manufacture is shortened. In addition, in at least one of the second and fourth steps, a plate-like glass material is laminated by coupling. Thus, as compared to a conventional method in which a glass material is deposited, the manufacturing steps are simplified. Therefore, the time for manufacture is shortened, and the manufacturing cost is reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 shows an example of a conventional method of manufacturing an optical waveguide;

FIG. 3A is a plan view schematically showing an upper mold and a lower mold applied to the optical element forming apparatus shown in FIG. 2, in a press-coupling step in the manufacturing method of the present invention;

FIG. 3B is a cross-sectional view taken along line A—A in FIG. 3A;

FIG. 4A is a plan view schematically showing another upper mold applied to the optical element forming apparatus shown in FIG. 2 in a press forming step in the manufacturing method of the present invention;

FIG. 4B is a cross-sectional view taken along line B—B in FIG. 4A;

FIGS. 9A, 9B, 9C, 9D, 9E, 9F, 9G, 9H and 9I schematically illustrate first to ninth steps of an optical waveguide manufacturing method according to a first embodiment of the present invention;

FIG. 10 is a microscopic photograph showing a cross section of a junction plane between a first glass material (LAL12) and a second glass material (BAH71) press-coupled in a first step illustrated in FIG. 9A;

FIG. 12 is a microscopic photograph showing a cross section of a junction plane between a first glass material (BK7) and a second glass material (VC-78) press-coupled in the seventh step illustrated in FIG. 11G;

FIG. 13 is a microscopic photograph showing a cross section of a junction plane between a first glass material (BK7) and a third glass material (BK7) press-coupled in the ninth step illustrated in FIG. 11J;

FIGS. 14A, 14B, 14C, 14D, 14E, 14F, 14G and 14H schematically illustrate first to seventh steps of an optical waveguide manufacturing method according to a third embodiment of the present invention;

FIG. 15 is a view showing the shape of a recess portion of the upper mold shown in FIGS. 4A and 4B, which was measured by a 3D microscope;

FIG. 16 is a view showing the shape of a surface with a projection of the first glass material (BK7) press-formed in the third embodiment, which was measured by a 3D microscope;

FIG. 17 is a microscopic photograph showing a cross section of a junction plane between a first glass material (BK7) and a second glass material (FK3) press-coupled in the fourth step illustrated in FIG. 14D;

FIGS. 18A, 18B, 18C, 18D, 18E and 18F schematically illustrate first to sixth steps of an optical waveguide manufacturing method according to a fourth embodiment of the present invention;

FIGS. 19A, 19B, 19C, 19D, 19E, 19F and 19G schematically illustrate first to seventh steps of an optical waveguide manufacturing method according to a fifth embodiment of the present invention;

FIGS. 21A, 21B, 21C, and 21D schematically illustrate a method of simultaneously manufacturing a plurality of optical waveguides according to the present invention;

FIG. 23 is a cross-sectional view schematically showing a successive-type furnace comprising successively arranged heating zones and cooling zones.

DETAILED DESCRIPTION OF THE PREFERRED EMBODIMENTS

Embodiments of an optical waveguide manufacturing method according to the present invention will now be described with reference to the accompanying drawings.

Figure 2:
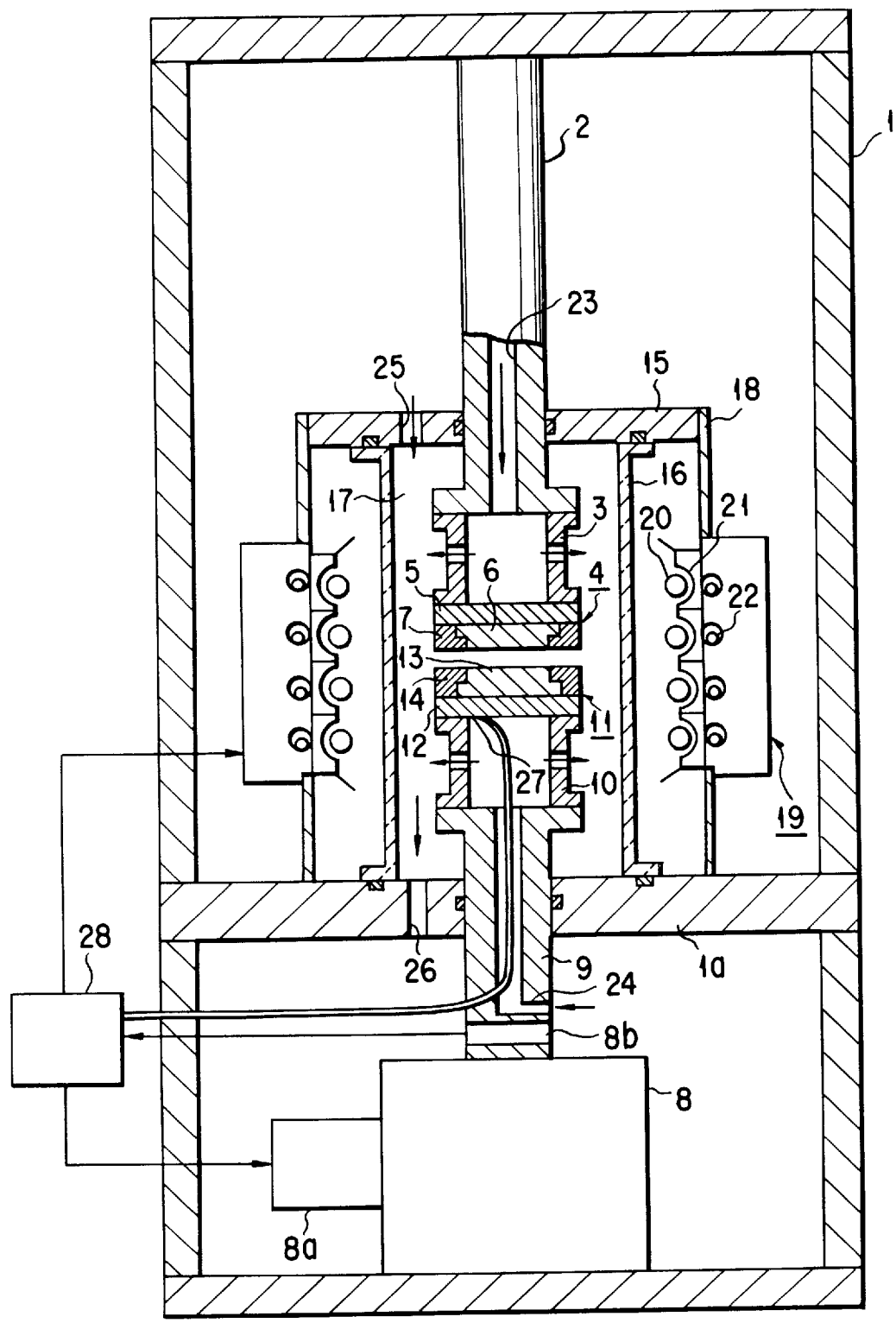
FIG. 2 is a cross-sectional view schematically showing an optical element forming apparatus used in a method of manufacturing an optical waveguide according to the present invention.

FIG. 2 shows an example of an optical element forming apparatus used in a method of manufacturing an optical waveguide according to the present invention.

As is shown in FIG. 2, the optical element forming apparatus comprises a frame 1, and an intermediate plate 1a situated at a substantially middle point of the frame 1. The optical element forming apparatus also comprises a stationary shaft 2 and a movable shaft 9 which are coaxially arranged.

The stationary shaft 2 extends downwards from an upper part of the frame 1. An upper mold assembly body 4 is attached to a lower end portion of the stationary shaft 2 by means of bolts (not shown), etc., with a ceramic heat insulating cylinder 3 interposed. The upper mold assembly body 4 comprises a metallic die plate 5 attached to the heat insulating cylinder 3, an upper mold 6 formed of a ceramic material or a hard metal, and a stationary die 7 for attaching the upper mold 6 to the die plate 5 and constituting a part of the mold structure.

The movable shaft 9 is attached to a driver 8, with a load detector 8b interposed. The load detector 8b detects a load which the movable shaft 9 applies to the stationary shaft 2. The driver 8 includes a screw jack for converting rotational movement of an electric motor, e.g. servo motor 8a, to linear drive force. The driver 8 is provided in a lower part of the frame 1. The movable shaft 9 attached to the driver 8 extends upwards and passes through a through-hole formed in the intermediate plate 1a, so that the movable shaft 9 faces the stationary shaft 2. The movable shaft 9 can move vertically while the outer periphery thereof hermetically slides through the through-hole in the intermediate plate 1a.

The optical element forming apparatus has a controller 28 for controlling the electric motor 8a and a lamp unit 19 (described later). A signal representing a load detected by the load detector 8b is fed back to the controller 28. The speed of movement, position, and pressing force of the movable shaft 9 are controlled by controlling the speed of rotation and torque of the servo motor 8a according to a program input to the controller 28 in advance.

In this embodiment, the electric motor is used as a driving source. However, a hydraulic mechanism using a hydraulic pump may be used as a driving source for the movable shaft 9.

A heat insulating cylinder 10 similar to the heat insulating cylinder 3 is attached to an upper end portion of the movable shaft 9. The lower mold assembly body 11 is attached to the movable shaft 9 with the heat insulating cylinder 10 interposed. Like the upper mold assembly body 4, the lower mold assembly body 11 comprises a metallic die plate 12, a lower mold 13 formed of a ceramic material or a hard metal, and a movable die 14.

As is shown in FIGS. 3A and 3B, in a press-coupling step in first to fifth embodiments (described later) of the method of manufacturing an optical waveguide, cylindrical molds with flat mutual-contact surfaces are used as upper mold 6 and lower mold 13.

Figure 5A:
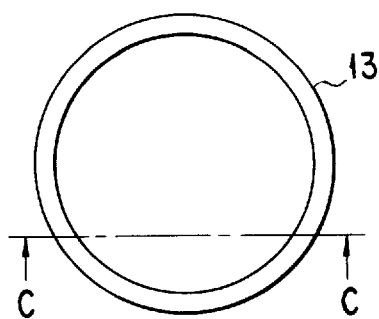
FIG. 5A is a plan view schematically showing a lower mold which is paired with the upper mold shown in FIG. 4A and FIG. 4B, and is applied to the optical element forming apparatus shown in FIG. 2 in the press forming step in the manufacturing method of the present invention.
Figure 5B:
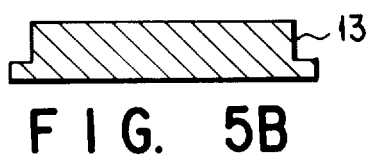
FIG. 5B is a cross-sectional view taken along line C—C in FIG. 5A.

As is shown in FIGS. 4A and 4B, in a press forming step in the third embodiment of the optical waveguide manufacturing method, a cylindrical mold having a recessed contact surface defined according to a desired circuit configuration of the optical waveguide is used as the upper mold 6. In addition, as shown in FIGS. 5A and 5B, in the press forming step in the third embodiment, a cylindrical mold with a flat contact surface is used as the lower mold 13.

Figure 6A:
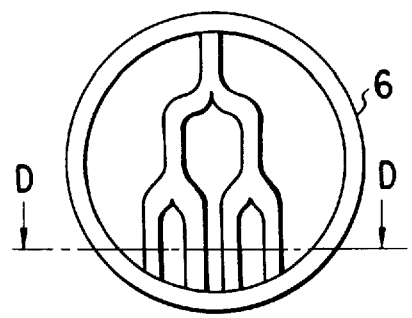
FIG. 6A is a plan view schematically showing another upper mold applied to the optical element forming apparatus shown in FIG. 2 in the press forming step in the manufacturing method of the present invention.
Figure 6B:
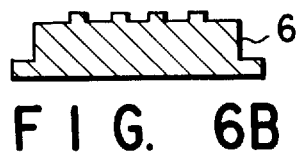
FIG. 6B is a cross-sectional view taken along line D—D in FIG. 6A.
Figure 7A:
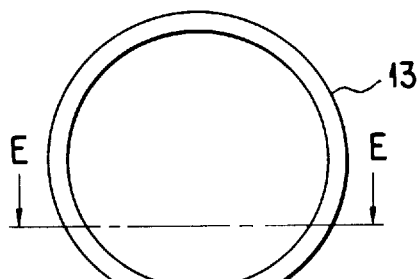
FIG. 7A is a plan view schematically showing a lower mold which is paired with the upper mold shown in FIG. 6A and FIG. 6B, and is applied to the optical element forming apparatus shown in FIG. 2 in the press forming step in the manufacturing method of the present invention.
Figure 7B:
FIG. 7B is a cross-sectional view taken along line E—E in FIG. 7A.

As is shown in FIGS. 6A and 6B, in a press forming step in the fourth and fifth embodiments of the optical waveguide manufacturing method, a cylindrical mold having a projecting contact surface defined according to a desired circuit configuration of the optical waveguide is used as the upper mold 6. In addition, as shown in FIGS. 7A and 7B, in the press forming step in the fourth and fifth embodiments, a cylindrical mold with a flat contact surface is used as the lower mold 13.

Referring back to FIG. 2, the optical element forming apparatus includes a bracket 15 which is vertically moved by a driver (not shown). The bracket 15 is engaged with the stationary shaft 2 so as to be vertically movable. The stationary shaft 2 extends downwards and passes through a through-hole formed in the bracket 15 so that the stationary shaft 2 faces the movable shaft 9. The bracket 15 can vertically slide on the stationary shaft 2 while hermetically sealing between the through-hole in the bracket 15 and the stationary shaft 2 is being maintained.

A transparent quartz tube 16 surrounding the paired upper and lower mold assembly bodies 4 and 11 is coupled to the bracket 15. A lower end portion of the transparent quartz tube 16 is put in hermetical contact with the intermediate plate 1a through which the movable shaft 9 is passed. The transparent quartz tube 16 defines a forming chamber 17 which shuts off the surrounding atmosphere of the upper and lower mold assembly bodies 4 and 11 from the outside atmosphere.

An outer cylinder 18 is attached to the bracket 15. The inner surface of the outer cylinder 18 is provided with an infrared lamp unit 19 serving as a heating device. The infrared lamp unit 19 comprises a plurality of infrared lamps 20, a plurality of reflection mirrors 21 and a water-cooling pipe 22. The reflection mirrors 21 are situated behind the infrared lamps 20 and reflect infrared towards the transparent quartz tube 16. The water-cooling pipe 22 is helically wound around the outer surface of each reflection mirror 21 and cools the reflection mirrors 21.

The infrared lamp unit 19 heats the upper and lower mold assembly bodies 4 and 11 at a temperature set by the controller 28. The ambient temperature of the upper and lower mold assembly bodies 4 and 11 is detected by a temperature detection thermocouple 27 provided at the lower end portion of the lower mold assembly body 11 and the detected temperature signal is fed back to the controller 28.

The stationary shaft 2 has a gas supply passage 23 for cooling the upper mold assembly body 4. The movable shaft 9 has a gas supply passage 24 for cooling the lower mold assembly body 11. The bracket 15 has a gas supply passage 25 for creating an inert gas atmosphere within the forming chamber 17.

An inert gas is supplied from the gas supply passages 23, 24 and 25 at predetermined flow rates via flow-rate control meters (not shown). The inert gas supplied to the forming chamber 17 is exhausted through an exhaust port 26 formed in the intermediate plate 1a.

A method of manufacturing the optical waveguide according to the present invention will now be described.

Figure 8A:
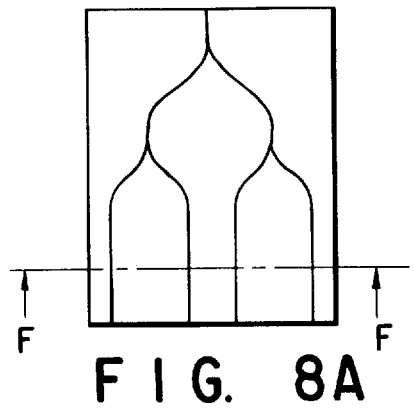
FIG. 8A is a plan view schematically showing an example of an optical waveguide manufactured by the method of the present invention.
Figure 8B:
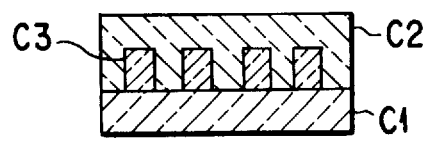
FIG. 8B is a cross-sectional view taken along line F—F in FIG. 8A.

FIGS. 8A and 8B show a four-branch optical waveguide as an example of the optical waveguide manufactured by the method of the present invention. The optical waveguide comprises claddings C1 and C2 formed of one or two kinds of glass materials having equal or substantially equal refractive indices, and a core C3 formed of a glass material having a refractive index slightly higher than the refractive indices of the claddings C1 and C2. The core C3 is covered with the claddings C1 and C2.

A method of manufacturing the optical waveguide according to a first embodiment of the invention will now be described with reference to FIGS. 9A to 9I.

In a first step illustrated in FIG. 9A, a first plate-like glass material 101 and a second plate-like glass material 102 are prepared. The first plate-like glass material 101 has flat surfaces on both sides (e.g. LAL12 manufactured by OHARA; refractive index=1.67790; glass transition point= 650° C.). The second plate-like glass material 102 has flat surfaces on both sides (e.g. BAH71 manufactured by OHARA; refractive index=1.70200; glass transition point= 620° C.) and has a refractive index and a glass transition point different from those of the first glass material 101. The first glass material 101 corresponds to a cladding of the optical waveguide, and the second glass material 102 corresponds to a core of the optical waveguide. The second glass material 102 has a higher refractive index and a lower glass transition point than the first glass material 101.

The first glass material 101 and second glass material 102 are superposed on each other, and the combined structure is situated between the upper mold 6 and lower mold 13 of the optical element forming apparatus shown in FIG. 2. In this case, the molds with flat surfaces, as shown in FIGS. 3A and 3B, are used as the upper and lower molds 6 and 13 of this optical element forming apparatus.

The infrared lamp unit 19 of the forming apparatus is activated, thereby heating at a predetermined temperature the upper and lower molds 6 and 13 and the first and second glass materials 101 and 102 situated between the upper and lower molds 6 and 13. Then, the movable shaft 9 is raised and the first and second glass materials 101 and 102 are pressed with a predetermined pressing force.

The first and second glass materials 101 and 102 situated between the upper and lower molds 6 and 13 are heated and pressed by the optical element forming apparatus. Thus, the first and second glass materials 101 and 102 are coupled. In this press-coupling step, the press temperature corresponding to the heating temperature for heating the first and second glass materials 101 and 102 is set at a value near the glass transition point of the first glass material. The press force is such a weak force as not to deform the glass materials. In this embodiment, the press temperature is, e.g. 675° C., and the press force is, e.g. 250 Kgf.

The upper mold 6, lower mold 13 and first and second glass materials 101 and 102 situated between the upper and lower molds 6 and 13 are cooled by the inert gas supplied into the forming chamber 17 via the supply passages 23, 24 and 25.

Subsequently, in a second step illustrated in FIG. 9B, a molded product of the first and second glass materials 101 and 102, which have been press-coupled in the first step, is taken out of the optical element forming apparatus.

In a third step shown in FIG. 9C, a surface portion of the second glass material 102 press-coupled to the first glass material 101 in the first step is removed by machining such as polishing or grinding, or by chemical treatment such as etching, so that the thickness of the second glass material 102 is reduced to a predetermined value, e.g. 8 μm.

In a fourth step illustrated in FIG. 9D, a photoresist 103 containing a photosensitive polymer material, e.g. ultraviolet-curing resin, is coated to a thickness of several μm on the surface of the second glass material 102, a surface portion of which has already been removed in the third step. In the fourth step, the photoresist 103 is formed, for example, by whirl coating, dip coating, flow coating, spray coating, or roller coating.

In a fifth step illustrated in FIG. 9E, a desired circuit pattern of the optical waveguide is formed by exposure on the photoresist 103 coated in the fourth step. Then, the circuit pattern is developed by a predetermined developing liquid. That portion of the photoresist 103, which corresponds to the circuit pattern, is left by this exposure/development step.

The exposure step is effected, for example, by radiating ultraviolet through a photomask patterned according to a desired circuit configuration of the optical waveguide. Specifically, the photomask patterned according to the desired circuit configuration of the optical waveguide is situated above the photoresist 103 coated in the fourth step. Ultraviolet is radiated on the photoresist 103 through the photomask, and that portion of the photoresist 103, which is not covered by the photomask, is exposed to the ultraviolet. The exposed photoresist 103 is developed, and that portion of the photoresist 103 which is not covered by the pattern of the circuit configuration is dissolved by a developing liquid. The dissolved portion is removed and the remaining portion of the photoresist 103 forms the desired circuit pattern.

In the fifth step, an ultraviolet radiation source is used as an exposure light source. However, the light source may be replaced with a far infrared radiation source, an excimer laser, an x-ray source or an electron beam source, in accordance with photosensitive characteristics of the photoresist 103.

In a sixth step as shown in FIG. 9F, the second glass material 102 is subjected to wet-etching treatment by using an etchant, e.g. a predetermined etching liquid. Specifically, the exposed portion of the second glass material 102, i.e. the portion not covered by the photoresist 103 and not associated with the circuit pattern, is chemically eluted away by an etching liquid until the first glass material 101 is exposed. Thus, only that portion of the second glass material 102 associated with the desired circuit pattern is left.

In the sixth step, as shown in FIG. 9F, the wet etching treatment is used to etch the second glass material 102. However, dry etching treatment may be adopted.

In a seventh step, as illustrated in FIG. 9G, the photoresist 103 left on the partly etched second glass material 102 in the sixth step is removed.

In an eighth step, as illustrated in FIG. 9H, a third glass material 104 (e.g. L-LAL12 manufactured by OHARA; refractive index=1.67790; glass transition point=562° C.) is placed on the surface of the second glass material 102 projecting on the first glass material 101, and the resultant structure is situated between the upper mold 6 and lower mold 13 of the optical element forming apparatus shown in FIG. 2. The refractive index of the third glass material 104 is substantially equal to that of the first glass material 101, and the glass transition point of the third glass material 104 is lower than that of the second glass material 102. The third glass material 104 will become a cladding of the optical waveguide. In this case, the molds with flat mutual-contact surfaces, as shown in FIGS. 3A and 3B, are used as upper and lower molds 6 and 13 of the optical element forming apparatus.

Like the first step, the first, second and third glass materials situated between the upper and lower molds 6 and 13 are heated at a predetermined pressing temperature by the optical element forming apparatus and press-coupled with a predetermined pressing force. Thereby, the third glass material 104 is melted and, in a ninth step as shown in FIG. 9I, the uneven surface defined by the first glass material 101 and projecting second glass material 102 is completely buried by the third glass material 104. The press temperature for the pressing coupling is near the glass transition point of the second glass material. The press force is such a weak force as not to deform the first and second glass materials. In this embodiment, the press temperature is, e.g. 630° C., and the press force is, e.g. 250 Kgf.

The upper mold 6, lower mold 13 and first to third glass materials 101, 102 and 104 interposed between the upper and lower molds 6 and 13 are cooled by the inert gas supplied into the forming chamber 17.

Subsequently, the press-coupled first to third glass materials are taken out of the optical element forming apparatus.

Through the above-described first to ninth steps, an optical waveguide 100 is obtained, which comprises the second glass material 102 serving as core C3 and the first and third glass materials 101 and 104 serving as claddings C1 and C2.

The junction properties of the first and second glass materials 101 and 102 press-coupled in the first step are evaluated. FIG. 10 is a microscopic photograph of the junction portion between the first and second glass materials 101 and 102. As shown in the photograph of FIG. 10, the junction state between the first and second glass materials 101 and 102 is excellent. It is considered that good junction properties are obtained in the press coupling of the first step.

The transmission loss of the optical waveguide 100 manufactured in the first embodiment was measured. The transmission loss of the manufactured optical waveguide depends on the refractive index of the used glass materials, the absorption amount of near infrared radiation, the surface roughness of the core periphery, etc. An example of measured transmission loss is 1.5 db/km or less with respect to light with a wavelength of 1.3 $\mu$m. This value is very satisfactory for the optical waveguide.

As has been described above, according to the optical waveguide manufacturing method of the first embodiment, plate-like glass materials are press-coupled, in place of a conventional complex film-forming step using a vacuum apparatus. Thus, the time for manufacturing is reduced and the manufacturing steps are simplified. Therefore, the manufacturing cost is reduced.

In the first embodiment, the first and second glass materials are press-coupled in the first step, and the surface portion of the second glass material is removed in the third step so that the second glass material has a desired thickness. However, the third step may be omitted, if the second glass material with a desired thickness is coupled to the first glass material. Alternatively, if the second glass material having a glass transition point lower than that of the first glass material is used, the second glass material can be pressed to a desired thickness in the press coupling of the first step, while the second glass material is being heated up to the glass transition point or thereabouts. By adopting this coupling step, the third step of removing the surface portion of the second glass material can be dispensed with, and the manufacturing cost and manufacturing time are further reduced.

In the first embodiment, a plurality of glass materials are coupled by the press coupling in the first and eighth steps. One of the first and eighth steps may be replaced with another step. For example, in the first step, a second glass material may be deposited on a first glass material by flame hydrolysis deposition (FHD), physical vapor deposition (PVD) or chemical vapor deposition (CVD). Similarly, in the eighth step, a third glass material may be deposited on the first and second glass materials by FHD, PVD or CVD, thereby forming a cladding layer.

In the first embodiment, LAL12, BAH71 and L-LAL12 are used as glass materials. However, the glass materials are not limited to these, other alternative glass materials having the refractive index and thermal characteristics for press coupling (e.g. glass transition point) which are proper for optical waveguides may be used.

A method of manufacturing an optical waveguide according to a second embodiment of the invention will now be described with reference to FIGS. 11A to 11K.

Figure 11A:
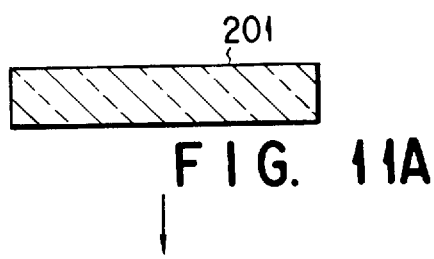
FIGS. 11A, 11B, 11C, 11D, 11E, 11F, 11G, 11H, 11I, 11J and 11K schematically illustrate first to tenth steps of an optical waveguide manufacturing method according to a second embodiment of the present invention.

In a first step illustrated in FIG. 11A, a plate-like first glass material 201 having flat surfaces on both sides and corresponding to a cladding of the optical waveguide (e.g. BK7 manufactured by SCHOTT; refractive index=1.51680; glass transition point=557° C.) is prepared.

Figure 11B:
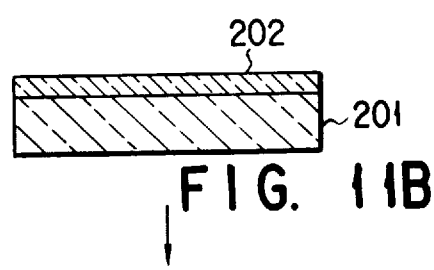

In a second step as illustrated in FIG. 11B, a photosensitive polymer material, i.e. a photoresist film 202 containing an ultraviolet-curing resin, is formed by whirl coating to a thickness of several $\mu$m on the first glass material 201 prepared in the first step. The film forming method used in the second step is not limited to the whirl coating, and may be, for example, dip coating, flow coating, spray coating, or roller coating.

Figure 11C:
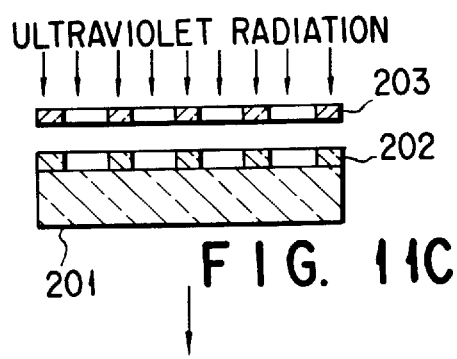

In a third step illustrated in FIG. 11C, a photomask 203 patterned according to a desired circuit configuration is situated above the photoresist 202 formed in the second step. Ultraviolet is radiated on the photoresist 202 through the photomask 203, and the photoresist 202 is exposed.

In general, the photomask 203 is of a positive type or a negative type. In this embodiment, a positive type photomask is used. That is, the portion corresponding to the circuit pattern passes ultraviolet.

In the third step, an ultraviolet radiation source is used as an exposure light source. However, the light source may be replaced with a far infrared radiation source, an excimer laser, an x-ray source or an electron beam source, in accordance with photosensitive characteristics of the photoresist 202.

Figure 11D:
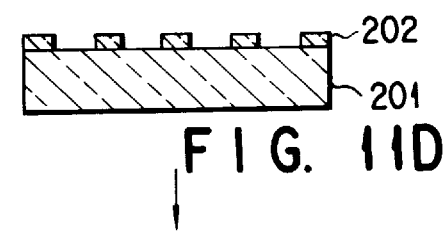

In a fourth step illustrated in FIG. 11D, the photoresist 202 exposed in the third step is developed, and the photosensitized portion of the photoresist 202 corresponding to the circuit pattern is dissolved. The dissolved portion of the photoresist 202 is removed, and a desired circuit pattern is formed by the exposed portion of the first glass material 201.

The third and fourth steps can be carried out in another method. For example, in the third step, a negative type photomask is used and the photoresist is exposed. In the fourth step, the exposed portion is not dissolved by a developing liquid, and the non-exposed portion corresponding to the circuit pattern is dissolved by the developing liquid and removed. By this method, the photoresist is removed and a desired circuit pattern is obtained by the exposed portion of the first glass material.

Figure 11E:
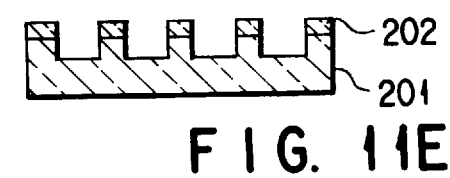

In a fifth step shown in FIG. 11E, the exposed portion of the first glass material 201, from which the photoresist 202 has been removed in the fourth step, is wet-etched by an etchant or an etching liquid.

In the fifth step, that portion of the first glass material 201, from which the photoresist 202 has been removed and which corresponds to the circuit pattern, is chemically eluted away. Thus, a recessed portion of the desired circuit pattern is formed on the first glass material 201, i.e. the upper surface of the first glass material 201 on which side the photoresist 202 is provided.

In this step, the wet etching was performed in forming the recessed portion in the first glass material 201. However, the wet etching may be replaced with dry etching.

Figure 11F:
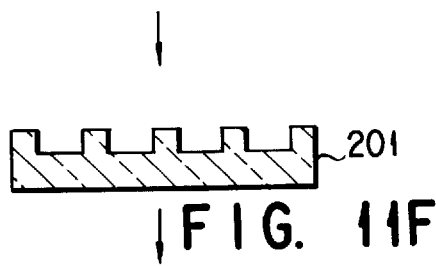

In a sixth step as shown in FIG. 11F, the photoresist 202 left on the first glass material 201 subjected to the etching treatment in the fifth step is removed.

Figure 11G:
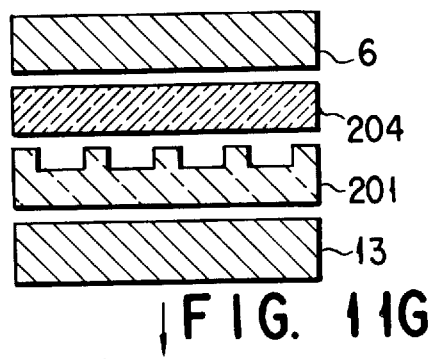

In a seventh step as illustrated in FIG. 11G, a second glass material 204 (e.g. VC-78 manufactured by SUMITA OPTICAL GLASS; refractive index=1.66910; glass transition point=530° C.) is placed on the recessed surface of the first glass material 201. The resultant structure is interposed between the upper mold 6 and lower mold 13 of the optical element forming apparatus shown in FIG. 2. The second glass material 204 has a higher refractive index and a lower glass transition point than the first glass material 201. The second glass material 204 corresponds to a core of the optical waveguide.

The infrared lamp unit 19 of the optical element forming apparatus is activated, thereby heating at a predetermined temperature the upper and lower molds 6 and 13 and the first and second glass materials 201 and 204 situated between the upper and lower molds 6 and 13. In addition, the movable shaft 9 is raised to press the first and second glass materials 201 and 204 with a predetermined pressing force.

Figure 11H:
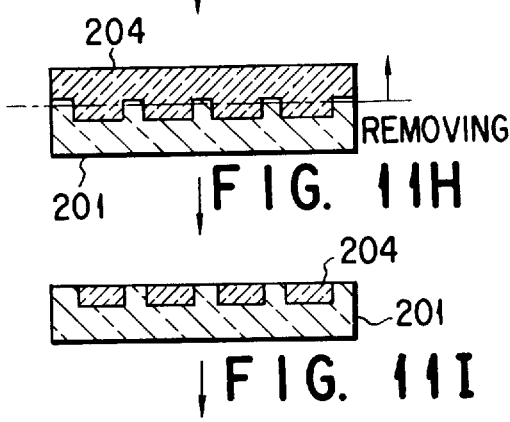

The first and second glass materials 201 and 204 situated between the upper and lower molds 6 and 13 are press-coupled while being heated by the optical element forming apparatus. Thus, the second glass material 204 is completely buried in the recessed portion of the first glass material 201, as shown in FIG. 11H. The press temperature for the press coupling is near the glass transition point of the first glass material 201. The press force is such a weak force as not to deform the first glass material 201. In this press coupling step of the second embodiment, the press temperature is, e.g. 600° C., and the press force is, e.g. 200 Kgf.

The molds with flat mutual-contact surfaces, as shown in FIGS. 3A and 3B, are used as upper and lower molds 6 and 13 in this press coupling step.

After the upper and lower molds 6 and 13 and the first glass material 201 coupled to the second glass material 204 are cooled down, the first glass material 201 coupled to the second glass material 204 is taken out of the optical element forming apparatus.

Figure 11I:
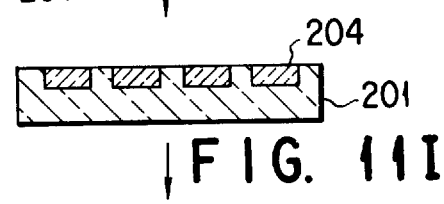

In an eighth step illustrated in FIG. 11H, the first and second glass materials 201 and 204 press-coupled in the seventh step are subjected to machining such as grinding or polishing. Thus, that part of the second glass material 204, which is provided outside the recessed portion of the first glass material 201 and a part of the first glass material 201 are separated along a broken line in FIG. 11H and removed. As a result, as shown in FIG. 11I, the second glass material 204 buried in the recessed portion of the first glass material 201 has a predetermined thickness.

In the eighth step, the machining such as grinding or polishing for the first and second glass materials may be replaced with chemical treatment such as etching.

Figure 11J:
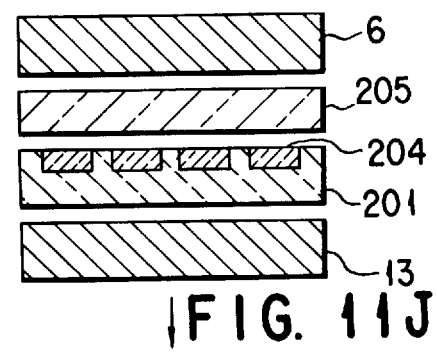

In a ninth step illustrated in FIG. 11J, a third glass material 205, e.g. BK7, which has the same or substantially the same characteristics as the first glass material 201, is placed on the ground/polished surface obtained in the eighth step. The resultant structure is interposed between the upper and lower molds 6 and 13 of the optical element forming apparatus shown in FIG. 2. The third glass material 205 corresponds to a cladding of the optical waveguide.

Like the seventh step, the first to third glass materials 201, 204 and 205 are heated up to a predetermined press temperature by the heating device and press-coupled with a predetermined pressing force.

In the ninth step, it is desirable that the press temperature is near the glass transition point of the first glass material 205, i.e. a temperature at which deformation of the first and third glass materials 201 and 205 constituting the claddings is prevented as much as possible and at which the second glass material 204 constituting the core is deformed.

It is desirable that the press force in the ninth step is so weak that the first to third glass materials 201, 204 and 205 may not be damaged. In addition, in this case, it is important that the claddings and core are firmly coupled.

In the second embodiment, the press coupling is effected at the press temperature of 700° C. with the press force of 50 Kgf.

In the ninth step, like the seventh step, the molds with flat mutual-contact surfaces, as shown in FIGS. 3A and 3B, are used as upper and lower molds 6 and 13 of the optical element forming apparatus.

The upper and lower molds 6 and 13 and the first to third glass materials are cooled down.

Figure 11K:
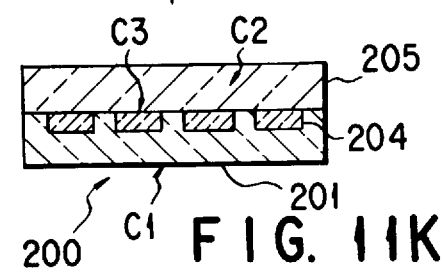

Subsequently, in a tenth step illustrated in FIG. 11K, the first to third glass materials press-coupled in the ninth step are taken out of the optical element forming apparatus. Thus, an optical waveguide 200 is obtained through the steps illustrated in FIGS. 11A to 11K.

The optical waveguide 200 obtained by the above-described steps comprises the first and third glass materials 201 and 205 serving as claddings C1 and C2 and the second glass material 204 buried in the recessed portion of the first glass material 201 serving as core C3.

The filling state of the second glass material 204 in the recessed portion of the first glass material 201 in the press coupling step (i.e. the seventh step) was evaluated. FIG. 12 is an enlarged photograph of the filling portion of the second glass material 204 in the first glass material 201. In the seventh step, it is important whether the second glass material 204 is fully filled or buried by press coupling in the recessed portion of the first glass material 201 formed by the wet etching. As shown in the enlarged photograph of FIG. 12, the filling state of the second glass material 204 was good. Thus, it is considered that the second glass material 204 is fully filled by the press coupling in the seventh step.

The junction properties between the first glass material 201 and third glass material 205 press-coupled in the ninth step were evaluated. FIG. 13 is an enlarged photograph of the junction portion between the first and third glass materials 201 and 205. As shown in FIG. 13, the junction state between the first and third glass materials 201 and 205 was good, and there is no boundary between them. Accordingly, it is considered that a very satisfactory junction state was obtained in the press coupling in the ninth step.

The transmission loss of the optical waveguide 200 manufactured in the second embodiment was measured. The transmission loss of the manufactured optical waveguide depends on the refractive index of the used glass materials, the absorption amount of near infrared radiation, the surface roughness of the core periphery, etc. An example of measured transmission loss is 1.5 db/km or less with respect to light with wavelength of 1.3 $\mu$m. This value is very satisfactory for the optical waveguide.

As has been described above, according to the optical waveguide manufacturing method of the second embodiment, the number of film-forming steps, in which a vacuum apparatus is conventionally used, can be reduced. Thus, the time for manufacturing is reduced and the manufacturing steps are simplified. Therefore, the manufacturing cost is reduced.

The complex shape of the core, i.e. the circuit configuration of the optical waveguide, is formed by the etching treatment. Thereby, the fine core can be produced easily and precisely. Thus, optical waveguides can be mass-produced stably at low cost.

In the second embodiment, in the seventh and ninth steps, the press coupling is performed by using the optical element forming apparatus. However, in one of these steps, glass materials may be deposited by flame hydrolysis deposition (FHD), physical vapor deposition (PVD) or chemical vapor deposition (CVD). Similarly, in the eighth step, a third glass material may be deposited on the first and second glass materials by FHD, PVD or CVD, thereby forming a core or a cladding layer.

In the second embodiment, BK7 and VC-78 are used as glass materials. However, the glass materials are not limited to these, other alternative glass materials having a proper refractive index and proper thermal characteristics for optical waveguides may be used.

A method of manufacturing an optical waveguide according to a third embodiment of the invention will now be described with reference to FIGS. 14A to 14H.

In a first step as illustrated in FIG. 14A, a first glass material 301 having flat surfaces on both sides and corresponding to a core layer of the optical waveguide (e.g. BK7 manufactured by SCHOTT; refractive index=1.51680; glass transition point=557° C.; softening point=719° C.) is prepared.

In a second step illustrated in FIG. 14B, the first glass material 301 prepared in the first step is situated between the upper and lower molds 6 and 13 of the optical element forming apparatus shown in FIG. 2.

In this case, a desired recessed circuit pattern of the optical waveguide is formed on the upper mold 6 of the optical element forming apparatus, as shown in FIGS. 4A and 4B. In addition, the mold with a flat surface, as shown in FIGS. 5A and 5B, is used as lower mold 13 of the optical element forming apparatus.

The infrared lamp unit 19 of the optical element forming apparatus is activated, thereby heating at a predetermined press temperature the upper and lower molds 6 and 13 and the first glass material 301 situated between the upper and lower molds 6 and 13. In addition, the movable shaft 9 is raised to press the first glass material 301 with a predetermined pressing force.

The first glass material 301 situated between the upper and lower molds 6 and 13 is press-formed while being heated by the optical element forming apparatus. Specifically, the recessed circuit pattern of the optical waveguide formed on the upper mold 6 is transferred onto the first glass material 301. The press temperature for the press forming is near the softening point of the first glass material, i.e. a temperature at which the first glass material can be deformed by pressing. Specifically, the press temperature for the press forming is 750° C., and the press force is, e.g., 500 Kgf.

Then, the upper and lower molds 6 and 13 and the first glass material 301 are cooled down.

In a third step illustrated in FIG. 14C, the first glass material 301 press-formed in the second step is taken out of the optical element forming apparatus. A portion of the first glass material 301, i.e. the portion corresponding to the core of the optical waveguide, is formed in a projecting shape.

In a fourth step as shown in FIG. 14D, a second glass material 302 (e.g. FK3 manufactured by SCHOTT; refractive index=1.46450; glass transition point=364° C.; softening point=622° C.) is placed on the entire projection-side surface of the first glass material 301. The resultant structure is interposed between the upper and lower molds 6 and 13 of the optical element forming apparatus shown in FIG. 2. The second glass material 302 has a lower refractive index and a lower glass transition point than the first glass material 301. The second glass material 302 corresponds to a cladding of the optical waveguide.

In the fourth step, the molds with flat mutual-contact surfaces, as shown in FIGS. 3A and 3B, are used as upper and lower molds 6 and 13 of the optical element forming apparatus.

The first and second glass materials 301 and 302 interposed between the upper and lower molds 6 and 13 are heated and pressed by the optical element forming apparatus. Thus, the first and second glass materials 301 and 302 are tightly coupled.

In the press coupling step, the press temperature is near the glass transition point of the first glass material 301 and at a temperature at which the second glass material 302 can be deformed under pressure. It is desirable that the press force is so weak that the first and second glass materials may not be damaged. In the third embodiment, the press coupling is effected at the press temperature of 565° C. with the press force of 200 Kgf.

The upper and lower molds 6 and 13 and the coupled first and second glass materials 301 and 302 are cooled down and then taken out of the optical element forming apparatus.

In a subsequent fifth step as illustrated in FIG. 14E, the first and second glass materials 301 and 302 press-coupled in the fourth step are machined by grinding or polishing. Thus, a part of the first glass material 301 and a part of the second glass material 302 are separated along a broken line in FIG. 14E and removed. As a result, the second glass material 302 has a predetermined thickness.

In the fifth step, the machining such as grinding or polishing may be replaced with chemical treatment such as etching.

FIG. 14F shows a formed structure ground and polished in the fifth step.

In a sixth step illustrated in FIG. 14G, a third glass material 303, e.g. FK7, which has an equal or a substantially equal refractive index to that of the second glass material press-coupled in the fourth step, is placed on the ground/polished surface obtained in the fifth step. The resultant structure is interposed between the upper and lower molds 6 and 13 of the optical element forming apparatus shown in FIG. 2. The third glass material 303 corresponds to a cladding of the optical waveguide.

Like the fourth step, the first to third glass materials are heated up to a predetermined press temperature by the optical element forming apparatus and press-coupled with a predetermined pressing force.

In the sixth step, the press temperature is near the glass transition point of the first glass material 301, and the press force may be so weak as not to damage the first to third glass materials.

In the third embodiment, the press coupling is effected at the press temperature of 565° C. with the press force of 50 Kgf.

In this press coupling step, like the fourth step, the molds with flat mutual-contact surfaces, as shown in FIGS. 3A and 3B, are used as upper and lower molds 6 and 13.

In a seventh step as illustrated in FIG. 14H, the first to third glass materials press-coupled in the sixth step are taken out of the optical element forming apparatus.

Through the above-described manufacturing steps, an optical waveguide 300 is obtained, which comprises the first glass material 301 serving as core C3 and the second and third glass materials 303 and 302 serving as claddings C1 and C2.

The transfer properties between the projecting portion of the first glass material 301 obtained by the press forming step shown in FIG. 14B and the recess portion of the upper mold 6 shown in FIGS. 4A and 4B used in this press forming step were evaluated.

FIG. 15 is a view showing the shape of a recessed portion of the upper mold 6 shown in FIGS. 4A and 4B, which was measured by a 3D microscope. FIG. 16 is a view showing the shape of the projecting surface of the first glass material 301 press-formed in the third embodiment, which was measured by a 3D microscope.

Model "NEW VIEW 100" (manufactured by ZYGO) was used as the measuring device. As shown in FIGS. 15 and 16, the transfer properties between the recessed portion of the upper mold 6 and the projecting portion of the first glass material 301 were excellent.

The junction properties between the coupled surfaces of the first glass material 301 and second glass material 302 coupled in the press coupling step (FIG. 14D) were evaluated. FIG. 17 is a microscopic photograph of a cross section of a junction portion of the press-coupled glass materials. The magnification of this photograph is 400. One graduation of the scale shown in FIG. 17 corresponds to 2.5 $\mu$m. It was confirmed, as shown in the photograph, that the first and second glass materials 301 and 302 are coupled in a good junction state with no gap.

The transmission loss of the optical waveguide 300 manufactured in the third embodiment was measured. The transmission loss of the manufactured optical waveguide depends on the refractive index of the used glass materials, the absorption amount of near infrared radiation, the surface roughness of the core periphery, etc. An example of measured transmission loss is 1.5 db/km or less with respect to light with wavelength of 1.3 $\mu$m. This value is very satisfactory for the optical waveguide.

As has been described above, according to the optical waveguide manufacturing method of the third embodiment, the plate-like glass materials are press-coupled, in place of a conventional complex film-forming step using a vacuum apparatus. Thus, the time for manufacturing is reduced and the manufacturing steps are simplified. Therefore, the manufacturing cost is reduced.

In the optical waveguide manufacturing method of the third embodiment, the projecting portion is formed on the first glass material by the press coupling in the second step. However, the projecting portion may be formed by etching treatment.

In the third embodiment, in the fourth and sixth steps, the press coupling is performed by using the optical element forming apparatus. However, in at least one of the fourth and sixth steps, the glass material may be formed by another method. Specifically, in the fourth step the second glass material may be deposited on the first glass material by physical vapor deposition (PVD), flame hydrolysis deposition (FHD), or chemical vapor deposition (CVD). Similarly, in the sixth step, the third glass material may be deposited on the first and second glass materials by, e.g. PVD, FHD, or CVD.

In the third embodiment, BK7 and FK3 are used as glass materials. However, the glass materials are not limited to these and other materials may be combined if the glass materials have a proper refractive index, etc. for optical waveguides.

A method of manufacturing an optical waveguide according to a fourth embodiment of the invention will now be described with reference to FIGS. 18A to 18F.

In a first step as illustrated in FIG. 18A, a first glass material 401 (e.g. SiO$_2$) having flat surfaces on both sides and corresponding to a cladding of the optical waveguide is prepared.

In a second step illustrated in FIG. 18B, the first glass material 401 prepared in the first step is situated between the upper and lower molds 6 and 13 of the optical element forming apparatus shown in FIG. 2.

In this case, a desired projecting circuit pattern of the optical waveguide is formed on the upper mold 6 of the optical element forming apparatus, as shown in FIGS. 6A and 6B. In addition, the mold with a flat surface, as shown in FIGS. 7A and 7B, is used as lower mold 13 of the optical element forming apparatus.

The infrared lamp unit 19 of the optical element forming apparatus is activated, thereby heating at a predetermined press temperature the upper and lower molds 6 and 13 and the first glass material 401 situated between the upper and lower molds 6 and 13. In addition, the movable shaft 9 is raised to press the first glass material 401 with a predetermined pressing force.

The first glass material 401 situated between the upper and lower molds 6 and 13 is press-formed while being heated by the optical element forming apparatus. Specifically, the projecting circuit pattern of the optical waveguide formed on the upper mold 6 is transferred onto the first glass material 401. It is desirable that the press temperature for the press forming is near the softening point of the first glass material 401, i.e. a temperature at which the first glass material can be deformed by pressing. Specifically, the press temperature for the press forming is 1250° C., and the press force is, e.g. 800 Kgf.

Then, the upper and lower molds 6 and 13 and the first glass material 401 are cooled down.

In a third step illustrated in FIG. 18C, the first glass material 401 press-formed in the second step is taken out of the optical element forming apparatus. A portion of the first glass material 401, i.e. the portion corresponding to the core of the optical waveguide, is formed in a recessed shape.

In a fourth step as shown in FIG. 18D, a second glass material 402 (e.g. Ge-SiO$_2$) having a refractive index different from that of the first glass material 401 is deposited by physical vapor deposition (PVD) on the entire recess-side surface of the first glass material 401. The second glass material 402 has a higher refractive index than the first glass material 401. The second glass material 402 corresponds to a core of the optical waveguide.

In the fourth step, the second glass material 402 is deposited to an adequate thickness so that the second glass material 402 is sufficiently filled in the recessed portion of the first glass material 401 press-formed in the second step.

In a subsequent fifth step as illustrated in FIG. 18E, the first and second glass materials 401 and 402 are machined by grinding or polishing. Thus, a part of the first glass material 401 press-formed in the second step and a part of the second glass material 402 deposited in the fourth step are separated along a broken line in FIG. 18D and removed. As a result, the second glass material 402 has a predetermined thickness.

In the fifth step, the machining such as grinding or polishing may be replaced with chemical treatment such as etching.

In a sixth step illustrated in FIG. 14F, a third glass material 403 (e.g. SiO$_2$), which has an equal or a substantially equal refractive index to that of the first glass material 401 press-coupled in the second step, is deposited by PVD to a predetermined thickness on the ground/polished surface obtained in the fifth step.

Through the above-described manufacturing steps, an optical waveguide 400 is obtained, which comprises the first and third glass materials 401 and 403 serving as claddings C1 and C2 and the second glass material 402 filled in the recess portion of the first glass material 401 and serving as core C3.

As has been described above, according to the optical waveguide manufacturing method of the fourth embodiment, the conventional etching step is replaced with the press forming step. Thus, the time for manufacturing is reduced and the manufacturing steps are simplified. Therefore, the manufacturing cost is reduced.

In the fourth and sixth steps, the glass materials are deposited by physical vapor deposition (PVD). However, the glass materials may be deposited by flame hydrolysis deposition (FHD), or chemical vapor deposition (CVD). Alternatively, the fourth and sixth steps may be performed such that a plurality of glass materials with a plate-like shape are press-coupled.

In the fourth embodiment, SiO$_2$ and Ge-SiO$_2$ are used as glass materials. However, the glass materials are not limited to these and other materials may be combined if the glass materials have a proper refractive index, etc. for optical waveguides.

A method of manufacturing an optical waveguide according to a fifth embodiment of the invention will now be described with reference to FIGS. 19A to 19G.

In a first step as illustrated in FIG. 19A, a first glass material 501 (e.g. BK7) having flat surfaces on both sides and corresponding to a cladding of the optical waveguide is prepared.

In a second step illustrated in FIG. 19B, the first glass material 501 prepared in the first step is situated between the upper and lower molds 6 and 13 of the optical element forming apparatus shown in FIG. 2.

In this case, a desired projecting circuit pattern of the optical waveguide is formed on the upper mold 6 of the optical element forming apparatus, as shown in FIGS. 6A and 6B. In addition, the mold with a flat surface, as shown in FIGS. 7A and 7B, is used as lower mold 13 of the optical element forming apparatus.

The infrared lamp unit 19 of the optical element forming apparatus is activated, thereby heating at a predetermined press temperature the upper and lower molds 6 and 13 and the first glass material 501 situated between the upper and lower molds 6 and 13. In addition, the movable shaft 9 is raised to press the first glass material 501 with a predetermined pressing force.

The first glass material 501 situated between the upper and lower molds 6 and 13 is press-formed while being heated by the optical element forming apparatus. Specifically, the projecting circuit pattern of the optical waveguide formed on the upper mold 6 is transferred onto the first glass material 501. It is desirable that the press temperature for the press forming is near the softening point of the first glass material 501, i.e. a temperature at which the first glass material can be deformed by pressing. Specifically, the press temperature for the press forming is 705° C., and the press force is, e.g. 500 Kgf.

Then, the upper and lower molds 6 and 13 and the first glass material 501 are cooled down.

In a third step illustrated in FIG. 19C, the first glass material 501 press-formed in the second step is taken out of the optical element forming apparatus. A portion of the first glass material 501, i.e. the portion corresponding to the core of the optical waveguide, is formed in a recessed shape.

In a fourth step as shown in FIG. 19D, a second glass material 502 (e.g. P-SK11 manufactured by SUMITA OPTICAL GLASS; refractive index=1.56580 glass transition point=410° C.) having a refractive index different from that of the first glass material 501 is formed by dipping on the entire recess-side surface of the first glass material 501. The second glass material 502 has a higher refractive index and a lower softening point than the first glass material 501. The second glass material 502 corresponds to a core of the optical waveguide.

By the dipping, the second glass material 502 is filled in the recessed portion of the first glass material 501. In this case, if the first glass material 501 press-formed in the second step is pre-heated, damage to the first glass material 501 due to thermal shock, etc. is prevented in the dipping step.

Alternatively, in the fourth step, the second glass material 502 of very fine glass fibers may be placed in the recessed portion of the first glass material 501 and filled in the recessed portion by heating the entire structure until the second glass material 502 alone has fluidity.

Alternatively, the fourth step may be performed such that a plurality of glass materials with a plate-like shape are press-coupled.

In a subsequent fifth step as illustrated in FIG. 19E, the first and second glass materials 501 and 502 are machined by grinding or polishing. Thus, a part of the first glass material 501 press-formed in the second step and a part of the second glass material 502 formed by dipping in the fourth step are separated along a broken line in FIG. 19D and removed. As a result, the second glass material 502 has a predetermined thickness.

In the fifth step, the machining such as grinding or polishing may be replaced with chemical treatment such as etching.

In a sixth step illustrated in FIG. 19F, a third glass material 503 (e.g. BK7), which has an equal or a substantially equal refractive index to that of the first glass material 501 press-coupled in the second step, is placed on the ground/polished surface obtained in the fifth step. The resultant structure is interposed between the upper and lower molds 6 and 13 of the optical element forming apparatus shown in FIG. 2.

In this case, the molds with flat mutual-contact surfaces, as shown in FIGS. 3A and 3B, are used as upper and lower molds 6 and 13 of the optical element forming apparatus.

The first to third glass materials are heated and pressed by the optical element forming apparatus at a predetermined press temperature with a predetermined press force. Thus, the first to third glass materials are coupled.

In the press coupling step, the press temperature is near the glass transition point of the first glass material 503 and the press force is so weak that the first to third glass materials may not be deformed.

The upper and lower molds 6 and 13 and the coupled first to third glass materials 501, 502 and 503 are cooled down.

In a seventh step illustrated in FIG. 19G, the first to third glass materials press-coupled in the sixth step are taken out of the optical element forming apparatus.

Through the above-described manufacturing steps, an optical waveguide 500 is obtained, which comprises the first and third glass materials 501 and 503 serving as claddings C1 and C2 and the second glass material 502 serving as core C3.

The transfer properties between the upper mold 6 used in the press forming steps (i.e. the second steps in FIGS. 18B and 19B) in the fourth and fifth embodiments, i.e. the projecting portion of the upper mold 6 shown in FIGS. 6A and 6B, and the recess portion of the first glass material 501 press-formed in the second step shown in, e.g., FIG. 19B were substantially equal to the transfer properties between the first glass material 301 and the upper mold used in the press forming step (i.e. the second step) in the third embodiment.

Figure 20:
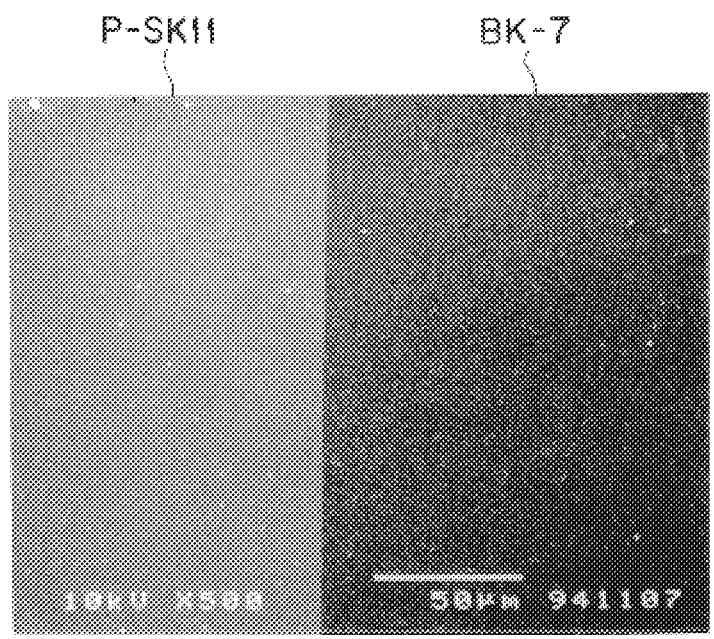
FIG. 20 is a microscopic photograph showing a cross section of a junction plane between a second glass material (P-SK11) and a third glass material (BK7) press-coupled in the sixth step illustrated in FIG. 19F.

The junction properties between the coupled surfaces of the second glass material 502 and third glass material 503 coupled in the sixth step (FIG. 19F) of the fifth embodiment were evaluated. FIG. 20 is a microscopic photograph of a junction portion of the coupled glass materials in the sixth step (press-coupling step) of the fifth embodiment. It was confirmed, as shown in the photograph, that the second and third glass materials 502 and 503 are coupled in a good junction state with no gap.

The transmission loss of the optical waveguide 500 manufactured in the fifth embodiment was measured. The transmission loss of the manufactured optical waveguide depends on the refractive index of the used glass materials, the absorption amount of near infrared radiation, the surface roughness of the core periphery, etc. An example of measured transmission loss is 1.5 db/km or less with respect to light with wavelength of 1.3 $\mu$m. This value is very satisfactory for the optical waveguide.

As has been described above, according to the optical waveguide manufacturing method of the fifth embodiment, the conventional complex etching steps and film-forming steps can be omitted. Thus, the time for manufacturing is reduced and the manufacturing cost is reduced. Once a mold having a desired circuit pattern of the optical waveguide has been prepared, complex optical waveguides can be manufactured easily and precisely. Thus, optical waveguides can be mass-produced stably at low cost.

In the second step of the fourth embodiment and in the second step of the fifth embodiment, as shown in FIGS. 18B and 19B, the recess portion is formed by press forming in the glass material. However, the method of formation is not limited to the press forming, if the recessed portion is directly formed in the glass material by chemical treatment such as etching.

In the fifth embodiment, BK7 and FK3 are used as glass materials. However, the glass materials are not limited to these, other alternative glass materials having a proper refractive index, etc. for optical waveguides may be used.

In the first to fifth embodiments, methods of manufacturing buried-type optical waveguides have been described. These embodiments, however, are applicable to methods of manufacturing other types of optical waveguides, e.g. strip-type waveguides or lens-type waveguides.

As has been described above, according to the optical waveguide manufacturing methods of the third to fifth embodiments, the conventional complex etching steps and film-forming steps can be omitted. Thus, the time for manufacturing is reduced and the manufacturing cost is reduced. Once a mold having a desired circuit pattern of the optical waveguide has been prepared, complex optical waveguides can be manufactured easily and precisely. Thus, optical waveguides can be mass-produced stably at low cost.

In the above-described manufacturing steps, optical waveguides are manufactured one by one. However, a plurality of optical waveguides can be manufactured at one time by a method illustrated in FIGS. 21A to 21D.

As is shown in FIG. 21A, a single substrate 100 including a plurality of optical waveguides, which have been produced by the manufacturing steps of the first to fifth embodiments, are cut by a slicer using a diamond, etc. Specifically, the substrate 100 is cut along broken lines shown in the plan view of FIG. 21A and the cross-sectional view of FIG. 21B. Thus, a plurality of optical waveguides of desired size, as shown in the cross-sectional view of FIG. 21C, are obtained from the single substrate 100. According to this processing method, a plurality of optical waveguides can be efficiently manufactured in a short time with a small number of manufacturing steps.

The optical element forming apparatus shown in FIG. 2, which is applied to the first to fifth embodiments, comprises the infrared lamp unit as a heating device. However, an optical element forming apparatus having another type of heating device may be used.

Figure 22:
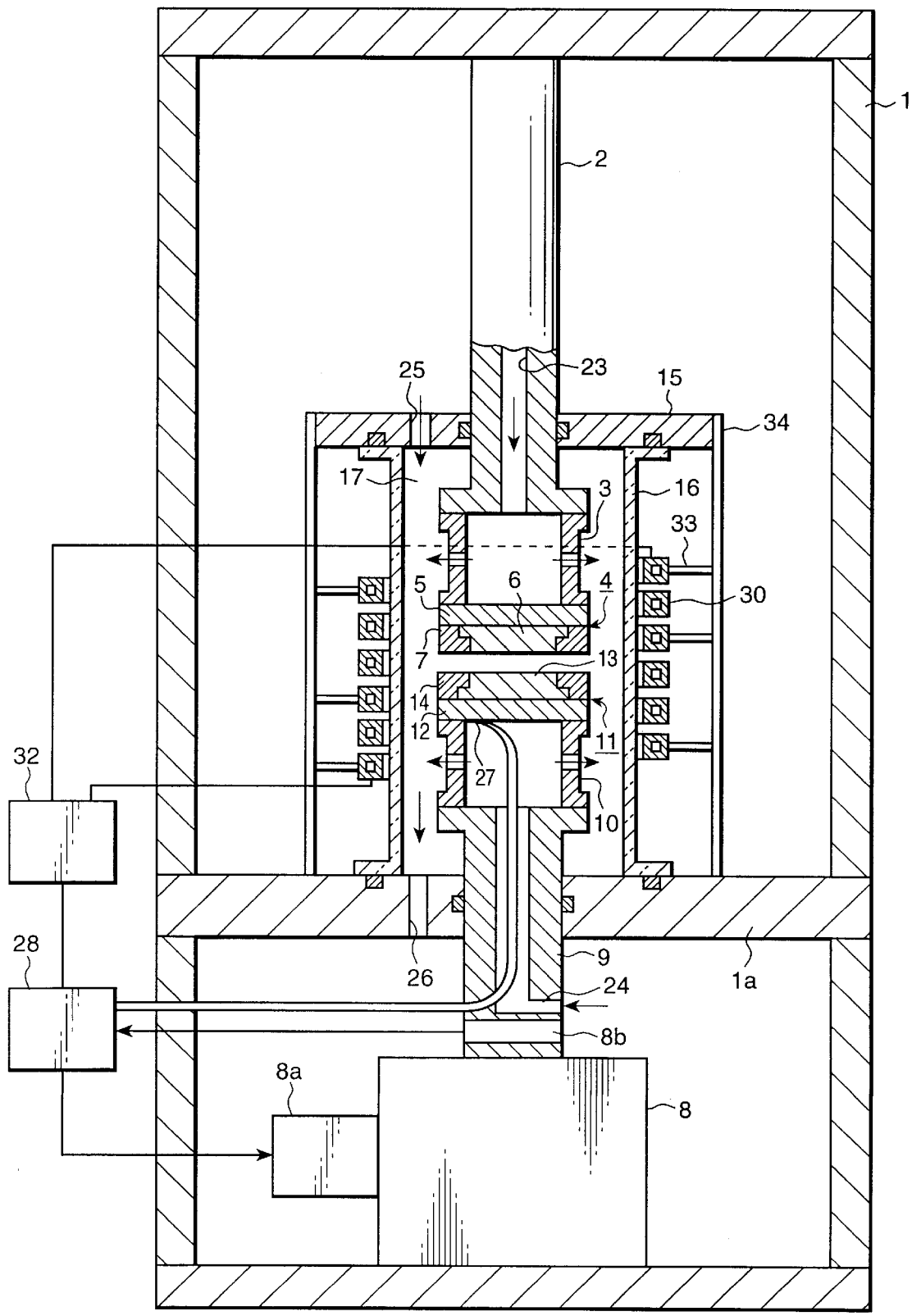
FIG. 22 is a cross-sectional view schematically showing an optical element forming apparatus to which a radio frequency induction heating device is applied as heating device.

An optical element forming apparatus having a radio frequency (RF) induction heating device as a heating device, as shown in FIG. 22, may be applied. This optical element forming apparatus has an RF induction heating coil 30 wound around the transparent quartz tube 16. The RF induction heating coil 30 includes a pipe through which cooling water flows.

Both ends of the RF induction heating coil 30 are connected to a radio frequency (RF) oscillator 32.

The RF induction heating coil 30 is supported by coil support members 33 formed of an insulating material and support rods 34 attached to the bracket 15.

The RF oscillator 32 is connected to the controller 28, which controls the RF oscillator 32 according to a program input in advance. The RF oscillator 32 is controlled by the controller 28, thereby supplying an RF current to the RF induction heating coil 30 and heating the upper mold assembly body 4 and lower mold assembly body 11. Thus, the glass materials situated between the upper mold 6 and lower mold 13 are indirectly heated.

In this manner, the glass materials may be heated by the RF induction heating device.

The structure of the heating device of the optical element forming apparatus is not limited to that shown in FIG. 2, wherein the glass materials and upper and lower molds 6 and 13 are arranged in a fixed manner within the forming chamber 17 surrounded by the infrared lamp unit. A successive-type furnace, as shown in FIG. 23, may be used, wherein a heating zone and a cooling zone are successively arranged and glass materials are moved from the heating zone to the cooling zone.

This successive-type furnace comprises a first load lock chamber 41 into which a mold assembly body 40 comprising a pair of molds and glass materials interposed therebetween is carried; a heating zone 42 situated adjacent to the first load lock chamber 41 and including an infrared lamp 50; a cooling zone 43 situated adjacent to the heating zone 42; and a second load lock chamber 44 from which the mold assembly body 40 is carried out.

The first load lock chamber 41, heating zone 42, cooling zone 43 and second load lock chamber 44 are interconnected via transfer ports 45a to 45e. The transfer ports 45a to 45e have openable covers 46a to 46e and can maintain hermetical sealing among the zones 41 to 44.

The first load lock chamber 41, heating zone 42, cooling zone 43 and second load lock chamber 44 have one-way convey mechanisms 47a to 47d. The mold assembly body 40 carried into the first load lock chamber 41 is transferred by the convey mechanisms 47a to 47d to the second load lock chamber 44 via the heating zone 42 and cooling zone 43 and carried out from the transfer port 45e.

In addition, the first load lock chamber 41, heating zone 42, cooling zone 43 and second load lock chamber 44 have supply ports 48a to 48d for supplying nitrogen gas ($N_2$) and exhaust ports 49a to 49d for exhausting the nitrogen gas.

The operation of the successive-type furnace will now be described.

The cover 46a is opened and the mold assembly body 40 is placed on the convey mechanism 47a within the first load lock chamber 41. With the covers 46a and 46b closed, nitrogen gas is supplied from the supply port 48a and the first load lock chamber 41 is filled with a nitrogen gas atmosphere. Subsequently, the cover 46b is opened and the convey mechanisms 47a and 47b are actuated to convey the mold assembly body 40 from the transfer port 45b into the heating zone 42.

In the heating zone 42, the infrared lamp 50 is turned on to heat the mold assembly body 40 and the convey mechanism 47b conveys the mold assembly body 40 towards the cooling zone 43. At this time, the covers 46b and 46c are closed and the heating zone 42 is filled with a nitrogen gas atmosphere. Then, the cover 46c is opened and the convey mechanisms 47b and 47c convey the mold assembly body 40 from the transfer port 45c into the cooling zone 43.

In the cooling zone, the mold assembly body 40 is cooled and the convey mechanism 47c conveys the mold assembly body 40 towards the second load lock chamber 44. At this time, the covers 45c and 45d are closed and the cooling zone 43 is filled with a nitrogen gas atmosphere. Then, the cover 46d is opened and the convey mechanisms 47c and 47d convey the mold assembly body 40 from the transfer port 45d into the second load lock chamber 44.

After the cover 46d is closed, the cover 46e is opened and the mold assembly body 40 is carried out from the transfer port 45e.

The glass materials may be heated by this successive-type furnace.

In the first to fifth embodiments, the press coupling step and press forming step are carried out by forcibly pressing the glass materials in a mechanical manner by using the optical element forming apparatus as shown in FIG. 2. However, these steps may be performed in another method.

Specifically, the press coupling step may be performed in the following manner. For example, a plurality of glass materials are placed on a lower mold with a flat surface or interposed between a pair of upper and lower molds having flat surfaces. The glass materials are heated by a freely chosen heating device. The glass materials are pressed, softened and coupled by one of, or a combination of, the dead weight of the glass materials, the dead weight of the upper mold placed on the glass materials and the dead weight of a load placed on the upper mold.

The press forming step may be performed in the following manner. For example, glass materials are interposed between a pair of upper and lower molds, at least one of which has a shape necessary for forming a desired shape. The glass materials interposed between the molds are heated by a freely chosen heating device and pressed by at least one of the dead weight of the upper mold and the dead weight of a load placed on the upper mold. Thus, the glass materials are formed in a desired shape.

As has been described above, according to the optical waveguide manufacturing method of the present invention, a core of an optical waveguide is formed in a desired shape by subjecting glass materials not to etching treatment but to press forming. In addition, when a cladding and a core of an optical waveguide are formed, glass materials are not deposited. Instead, desired glass materials are press-coupled. Complex, time-consuming etching treatment steps and deposition steps are omitted and, instead, quick press forming steps and press forming steps are adopted. Thereby, the time for manufacturing the optical waveguide is shortened, the manufacturing steps are simplified, and the manufacturing cost is reduced.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing an optical waveguide comprising:

a first step of laminating, on one major surface of a first glass material having a first glass transition point, a second glass material to a desired thickness, said second glass material having optical characteristics different from those of said first glass material and having a second glass transition point lower then said first glass transition point;

a second step of removing a non-circuit-pattern portion of said second glass material and forming a desired circuit pattern by said second glass material laminated on said first glass material to said desired thickness; and a third step of placing, on an overall surface of said first glass material with said second glass material of a desired circuit pattern formed thereon, a third glass material having optical characteristics similar to those of said first glass material and having a third glass transition point lower than said first and second glass transition points, and pressing said third glass material against said first glass material while heating said first through third glass materials at a temperature near said second glass transition point, thereby substantially maintaining said desired circuit pattern on said first glass material, and covering said first and second glass materials with said third glass material, with the non-circuit-pattern portions of said first glass material filled with said third glass material, on which the second glass material does not exist.

2. The method according to claim 1, wherein said first glass material has a first glass transition point, said second glass material has a second glass transition point lower than said first glass transition point, and said third glass material has a third glass transition point lower than the first and second glass transition points, and in said third step, said first glass material including the second glass material and said third glass material are situated between a pair of molds with flat surfaces and pressed and coupled by said molds while being heated at a temperature near the second glass transition point.

3. The method according to claim 2, wherein in said third step, said first, second and third glass materials are coupled by using an optical element forming apparatus comprising said pair of molds, heating means for heating the molds and glass materials between the molds at a temperature near the second glass transition point, driving means for moving one of the molds towards the other of the molds, and control means for controlling the heating temperature of the molds and glass materials between the molds heated by the heating means, the position of said one of the molds moved by the driving means, and a pressing force for pressing said glass materials between the molds.

4. The method according to claim 3, wherein said heating means is one of an infrared lamp heating device and a radio frequency induction heating device.

5. The method according to claim 2, wherein heating means for heating the molds and glass materials between the molds is a successive-type furnace wherein a heating zone and a cooling zone are arranged successively, and said third step is carried out such that the glass materials are moved from the heating zone to the cooling zone along with the pair of molds.

6. The method according to claim 1, wherein in said third step, said first glass material including the second glass material and said third material are arranged in one of a manner in which said first glass material including the second glass material and said third glass material are placed on one of a lower mold with a flat surface and a manner in which said first glass material including the second glass material and said third glass material are interposed between a pair of upper and lower molds having flat surfaces, and the first glass material including the second glass material and said third glass material are heated, and pressed and coupled by at least one of the dead weight of the upper mold placed on the glass materials and the dead weight of a load placed on the upper mold.

7. The method according to claim 1, wherein said third glass material coupled to said first and second glass materials in said third step has a refractive index substantially equal to that of the first glass material.

8. A method of manufacturing an optical waveguide, comprising:

a first step of forming a recessed portion in a first glass material in accordance with a desired circuit pattern;

a second step of laminating a second glass material having optical characteristics different from those of the first glass material by burying said second glass material in said recessed portion of the first glass material;

a third step of removing that portion of the second glass material, which is located outside the recessed portion; and a fourth step of laminating a third glass material having optical characteristics similar to those of the first glass material on that surface of the first glass material, in which the second glass material is buried, wherein said first glass material has a first glass transition point and said second glass material has a second glass transition point lower than said first glass transition point, and in said second step, the second glass material having flat surfaces on both sides thereof is placed on the surface with the recessed portion of the first glass material which has flat surfaces on both sides thereof, and the second glass material is pressed on the first glass material while the first and second glass materials are being heated at a temperature near said first glass transition point, whereby the second glass material is buried in the recessed portion of the first glass material.

9. The method of claim 8 wherein in said first step, said recessed portion corresponding to said desired circuit pattern is formed by molding said first glass material with use of a mold having a projecting portion formed in accordance with the desired circuit pattern.

10. The method according to claim 9, wherein in said first step, said first glass material is situated between a pair of molds and pressed by said molds while being heated at a temperature near the softening point of the first glass material, thereby forming said recessed portion.

11. The method according to claim 8, wherein said third glass material coupled to said first and second glass materials in said third step has a refractive index substantially equal to that of the first glass material.

12. The method according to claim 8, wherein in said second step, said first and second glass materials are arranged in one of a manner in which said first and second glass materials are placed on one of a lower mold with a flat surface and a manner in which said first and second glass materials are interposed between a pair of upper and lower molds having flat surfaces, and the first and second glass materials are heated, and pressed by at least one of the dead weight of the upper mold placed on the glass materials and the dead weight of a load placed on the upper mold, whereby the second glass material is buried in the recessed portion of the first glass material.

13. A method of manufacturing an optical waveguide, comprising:

a first step of forming a projecting portion on a first glass material in accordance with a desired circuit pattern, a second step of laminating a second glass material having optical characteristics different from those of the first glass material on an entire surface of the first glass material on which said projecting portion is formed;

a third step of removing that portion of said first glass material, from which said projecting portion is excluded;

a fourth step of laminating a third glass material having optical characteristics similar to those of the second glass material on that surface of the first glass material, from which said portion of the first glass material is removed, wherein said projecting circuit pattern on said first glass material is substantially maintained, and said first glass material is covered with said second glass material, with the non-circuit pattern portions of said first glass material filled with said second glass material, which consist of depressions in said first glass material; said first glass material has a first glass transition point and said second glass material has a second glass transition point lower than said first glass transition point, and in said second step, the second glass material having flat surfaces on both sides thereof is placed on said surface with the projecting portion of the first glass material having flat surfaces on both sides thereof, and the second glass material is pressed on the first glass material while the first and second glass materials are being heated at a temperature near said first glass transition point, whereby the second glass material is coupled to the first glass material.

14. The method according to claim 13, wherein said third glass material coupled to said first and second glass materials in said third step has a refractive index substantially equal to that of the first glass material.

15. The method according to claim 13, wherein in said first step, the first glass material is situated between a pair of molds, one of which has a recessed portion formed in accordance with a desired circuit pattern, and said first glass material is heated and pressed, thereby forming said projecting portion corresponding to said desired circuit pattern.

16. The method according to claim 15, wherein in said first step, said first glass material is situated between a pair of molds and pressed by said molds while being heated at a temperature near the softening point of the first glass material, thereby forming said recessed portion.

17. The method according to claim 13, wherein said first glass material has a first glass transition point and said second glass material has a second glass transition point lower than said first glass transition point, and in said second step, said first glass material and said second glass material are situated between a pair of molds with flat surfaces and pressed and coupled by said molds while being heated at a temperature near the first glass transition point.

18. The method according to claim 17, wherein in said second step, said first and second glass materials are coupled by using an optical element forming apparatus comprising said pair of molds, heating means for heating the molds and glass materials between the molds at a temperature near the first glass transition point, driving means for moving one of the molds towards the other of the molds, and control means for controlling the heating temperature of the molds and glass materials between the molds heated by the heating means, the position of said one of the molds moved by the driving means, and a pressing force for pressing said glass materials between the molds.

19. The method according to claim 18, wherein said heating means is one of an infrared lamp heating device and a radio frequency induction heating device.

20. The method according to claim 17, wherein heating means for heating the molds and glass materials between the molds is a furnace wherein a heating zone and a cooling zone are arranged successively, and said second step is carried out such that the glass materials are moved from the heating zone to the cooling zone along with the pair of molds.

21. The method according to claim 13, wherein in said second step, said first and second glass materials are arranged in one of a manner in which said first and second glass materials are placed on one of a lower mold with a flat surface and a manner in which said first and second glass materials are interposed between a pair of upper and lower molds having flat surfaces, and the first and second glass materials are heated, and pressed and coupled by at least one of the dead weight of the upper mold placed on the glass materials and the dead weight of a load placed on the upper mold.

22. A method of manufacturing an optical waveguide, comprising:

a first step of forming a recessed portion in a first glass material in accordance with a desired circuit pattern;

a second step of laminating a second glass material having optical characteristics different from those of the first glass material by burying said second glass material in said recessed portion of the first glass material;

a third step of removing that portion of the second glass material, which is located outside the recessed portion; and a fourth step of laminating a third glass material having optical characteristics similar to those of the first glass material on that surface of the first glass material, in which the second glass material is buried, wherein said first glass material has a first glass transition point and said second glass material has a second glass transition point lower than said first glass transition point, and in said second step, said first glass material and said second glass material are situated between a pair of molds with flat surfaces and pressed by said molds while being heated at a temperature near the first glass transition point, whereby the second glass material is buried in the recessed portion of the first glass material.

23. The method according to claim 22, wherein in said second step, said second glass material is buried in the recessed portion of the first glass material by using an optical element forming apparatus comprising said pair of molds, heating means for heating the molds and glass materials between the molds at a temperature near the first glass transition point, driving means for moving one of the molds towards the other of the molds, and control means for controlling the heating temperature of the molds and glass materials between the molds heated by the heating means, the position of said one of the molds moved by the driving means, and a pressing force for pressing said glass materials between the molds.

24. The method according to claim 23, wherein said heating means is one of an infrared lamp heating device and a radio frequency induction heating device.

25. The method according to claim 22, wherein heating means for heating the molds and glass materials between the molds is a furnace wherein a heating zone and a cooling zone are arranged successively, and said second step is carried out such that the glass materials are moved from the heating zone to the cooling zone along with the pair of molds.

* * * * *